US012600830B2

(12) United States Patent
Horinouchi et al.

(10) Patent No.: US 12,600,830 B2
(45) Date of Patent: *Apr. 14, 2026

(54) BIAXIALLY ORIENTED POLYPROPYLENE FILM

(71) Applicant: TOYOBO CO., LTD., Osaka (JP)

(72) Inventors: Kazuhito Horinouchi, Otsu (JP); Kouji Yamada, Otsu (JP); Kensuke Taneki, Inuyama (JP); Toru Imai, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 601 days.

This patent is subject to a terminal disclaimer.

(21) Appl. No.: 17/923,365

(22) PCT Filed: Jun. 23, 2021

(86) PCT No.: PCT/JP2021/023722
§ 371 (c)(1),
(2) Date: Apr. 14, 2023

(87) PCT Pub. No.: WO2021/261505
PCT Pub. Date: Dec. 30, 2021

(65) Prior Publication Data
US 2023/0235135 A1     Jul. 27, 2023

(30) Foreign Application Priority Data

Jun. 25, 2020     (JP) ................................. 2020-109787
Jun. 25, 2020     (JP) ................................. 2020-109788
Jun. 25, 2020     (JP) ................................. 2020-109789

(51) Int. Cl.
*C08J 5/18*          (2006.01)
(52) U.S. Cl.
CPC ............. *C08J 5/18* (2013.01); *C08J 2323/12* (2013.01); *C08J 2423/12* (2013.01)

(58) Field of Classification Search
CPC ...... C08F 10/06; C08F 110/06; C08F 210/06; C08L 23/10; C08L 23/12; C08L 23/14; C08L 23/142
See application file for complete search history.

(56) References Cited

U.S. PATENT DOCUMENTS 6,190,760 B1     2/2001     Nagai et al.
6,541,123 B1     4/2003     Taniguchi et al.
(Continued)

FOREIGN PATENT DOCUMENTS

CN          1223198 A          7/1999
CN          103128956 A          6/2013
(Continued)

OTHER PUBLICATIONS

Machine translation of JP 6477472 (Year: 2019).*
(Continued)

*Primary Examiner* — Zachary M Davis
(74) *Attorney, Agent, or Firm* — Leydig, Voit & Mayer, Ltd.

(57)          ABSTRACT

Provided is a biaxially oriented polypropylene film that has high stiffness and can easily retain a bag shape when made into a packaging bag even if the film is made thinner, and at the same time, that can maintain water vapor barrier properties even if the film is made thinner, and has few wrinkles in and around the sealed portion when heat-sealed to make a packaging body. The biaxially oriented polypropylene film satisfies the following (1) and (2): (1) a half width of a peak derived from an oriented crystal in a width direction in angular dependency of a (110) plane of polypropylene $\alpha$-type crystal obtained by wide-angle X-ray diffraction measurement is 26° or smaller; (2) the ratio of (III) to the total of a crystalline component (I), a restrained amorphous component (II), and an unrestrained amorphous component (Continued)

(III) classified by pulse NMR according to solid-echo method is 7% or lower.

16 Claims, 2 Drawing Sheets

(56) References Cited

U.S. PATENT DOCUMENTS

| 9,637,602 B2 | 5/2017 | Potter et al. |
| 12,104,025 B2 | 10/2024 | Yamada et al. |
| 2004/0247879 A1 | 12/2004 | Osada et al. |
| 2009/0136714 A1 | 5/2009 | Itou |
| 2010/0225032 A1 | 9/2010 | Nakane et al. |
| 2014/0220236 A1 | 8/2014 | Denifl et al. |
| 2015/0267014 A1 | 9/2015 | Neissl et al. |
| 2016/0304681 A1 | 10/2016 | Potter et al. |
| 2017/0157803 A1 | 6/2017 | Kuma et al. |
| 2018/0068791 A1 | 3/2018 | Fujimoto et al. |
| 2018/0082791 A1 | 3/2018 | Okuyama et al. |
| 2020/0198298 A1 | 6/2020 | Imanishi et al. |
| 2021/0213720 A1 | 7/2021 | Yoshii et al. |
| 2021/0388193 A1 | 12/2021 | Yamada et al. |
| 2022/0064388 A1 | 3/2022 | Yamada et al. |
| 2022/0073690 A1 | 3/2022 | Yamada et al. |
| 2022/0081521 A1 | 3/2022 | Yamada et al. |
| 2022/0089822 A1 | 3/2022 | Yamada et al. |
| 2023/0167255 A1 | 6/2023 | Horinouchi et al. |
| 2023/0203257 A1 | 6/2023 | Taneki et al. |
| 2023/0212361 A1 | 7/2023 | Nakano et al. |
| 2023/0212362 A1 | 7/2023 | Nakano et al. |
| 2024/0209167 A1 | 6/2024 | Taneki et al. |

FOREIGN PATENT DOCUMENTS

| CN | 106103553 A | 11/2016 |
| CN | 107406543 A | 11/2017 |
| CN | 108749019 A | 11/2018 |
| CN | 108884246 A | 11/2018 |
| CN | 109070568 A | 12/2018 |
| CN | 110023086 A | 7/2019 |
| EP | 0026911 A1 | 9/1980 |
| EP | 1090947 B1 | 7/2008 |
| EP | 1985649 A1 | 10/2008 |
| EP | 3069850 A1 | 9/2016 |
| EP | 3124523 A1 | 2/2017 |
| EP | 3296348 A1 | 3/2018 |
| EP | 3083777 B1 | 4/2019 |
| EP | 3124205 B1 | 4/2021 |
| EP | 4169716 A1 | 4/2023 |
| JP | H05-177790 A | 7/1993 |
| JP | H10-180963 A | 7/1998 |
| JP | H11-106520 A | 4/1999 |
| JP | H11-192680 A | 7/1999 |
| JP | 2001-040111 A | 2/2001 |
| JP | 2013-177645 A | 9/2013 |
| JP | 2014-051657 A | 3/2014 |
| JP | 2014-231584 A | 12/2014 |
| JP | 2015-199228 A | 11/2015 |
| JP | 2017-186561 A | 10/2017 |
| JP | 2017-226161 A | 12/2017 |
| JP | 2018-130958 A | 8/2018 |
| JP | 2018-141122 A | 9/2018 |
| JP | 6477472 B2 * | 3/2019 | ................ C08J 5/18 |
| JP | 6488703 B2 | 3/2019 |
| KR | 10-2014-0081807 A | 7/2014 |
| KR | 10-2014-0119117 A | 10/2014 |
| KR | 10-2015-0035736 A | 4/2015 |
| KR | 10-2016-0086327 A | 7/2016 |
| KR | 10-2018-0128027 A | 11/2018 |
| TW | 201210795 A | 3/2012 |
| WO | WO 2013/111779 A1 | 8/2013 |
| WO | WO 2014/103713 A1 | 7/2014 |
| WO | WO 2015/012324 A1 | 1/2015 |
| WO | WO 2015/091839 A1 | 6/2015 |
| WO | WO 2015/146893 A1 | 10/2015 |
| WO | WO 2016/002281 A1 | 1/2016 |
| WO | WO 2016/158590 A1 | 10/2016 |
| WO | WO 2016/182003 A1 | 11/2016 |
| WO | WO 2017/169952 A1 | 10/2017 |
| WO | WO 2017/170244 A1 | 10/2017 |
| WO | WO 2017/221781 A1 | 12/2017 |
| WO | WO 2018/180164 A1 | 10/2018 |
| WO | WO 2019/244708 A1 | 12/2019 |
| WO | WO 2020/137789 A1 | 7/2020 |
| WO | WO 2020/137790 A1 | 7/2020 |
| WO | WO 2020/137791 A1 | 7/2020 |
| WO | WO 2020/137792 A1 | 7/2020 |
| WO | WO 2020/137793 A1 | 7/2020 |
| WO | WO 2021/193509 A1 | 9/2021 |
| WO | WO 2021/256347 A1 | 12/2021 |
| WO | WO 2021/256350 A1 | 12/2021 |
| WO | WO 2021/261312 A1 | 12/2021 |
| WO | WO 2023/286541 A1 | 1/2023 |

OTHER PUBLICATIONS

European Patent Office, Extended European Search Report in European Patent Application No. 21828580.7 (Jun. 17, 2024).

European Patent Office, Extended European Search Report in European Patent Application No. 21829010.4 (Jun. 17, 2024).

European Patent Office, Extended European Search Report in European Patent Application No. 22841885.1 (Jun. 10, 2025).

Hada, "Surface Modification of Plastic Films," Journal of Japan Printing Society, 47(2): 8-13 (2010).

Okamoto, "High Functionality with Low Crystalline Polyolefins," Seikei-Kakou [Polymer Processing], 32(9): 312-316 (2020).

Japan Patent Office, Office Action in Japanese Patent Application No. 2023-535194 (May 28, 2024).

Japan Patent Office, Office Action in Japanese Patent Application No. 2023-535194 (Oct. 15, 2024).

Japan Patent Office, International Search Report in International Patent Application No. PCT/JP2021/023722 (Jul. 20, 2021).

Japan Patent Office, International Search Report in International Patent Application No. PCT/JP2021/022511 (Sep. 7, 2021).

Yan, "Processing Technology of Chemical Fibers," Donghua University Press, pp. 108-111 (2018).

China National Intellectual Property Administration, Office Action in Chinese Patent Application No. 201980085955.2 (Aug. 3, 2022).

China National Intellectual Property Administration, Office Action in Chinese Patent Application No. 201980085958.6 (Aug. 2, 2022).

China National Intellectual Property Administration, Notification of the Second Office Action in Chinese Patent Application No. 201980085958.6 (Feb. 5, 2023).

China National Intellectual Property Administration, Third Office Action in Chinese Patent Application No. 201980085958.6 (May 25, 2023).

China National Intellectual Property Administration, Office Action in Chinese Patent Application No. 201980085964.1 (Aug. 17, 2022).

China National Intellectual Property Administration, Office Action in Chinese Patent Application No. 201980086038.6 (Jul. 22, 2022).

China National Intellectual Property Administration, Notification of the Second Office Action in Chinese Patent Application No. 201980086038.6 (Feb. 9, 2023).

China National Intellectual Property Administration, Decision of Rejection in Chinese Patent Application No. 201980086038.6 (May 19, 2023).

China National Intellectual Property Administration, Office Action in Chinese Patent Application No. 201980086055.X (Sep. 9, 2022).

China National Intellectual Property Administration, Notification of the Second Office Action in Chinese Patent Application No. 201980086055.X (Apr. 3, 2023).

China National Intellectual Property Administration, First Office Action in Chinese Patent Application No. 202180022791.6 (Apr. 27, 2023).

China National Intellectual Property Administration, Second Office Action in Chinese Patent Application No. 202180022791.6 (Nov. 9, 2023).

(56) References Cited

OTHER PUBLICATIONS

China National Intellectual Property Administration, First Office Action in Chinese Patent Application No. 202180042537.2 (Nov. 3, 2023).
European Patent Office, Extended European Search Report in European Patent Application No. 19901456.4 (Aug. 18, 2022).
European Patent Office, Extended European Search Report in European Patent Application No. 19903250.9 (Aug. 18, 2022).
European Patent Office, Extended European Search Report in European Patent Application No. 19904532.9 (Aug. 18, 2022).
European Patent Office, Extended European Search Report in European Patent Application No. 19905465.1 (Aug. 25, 2022).
European Patent Office, Extended European Search Report in European Patent Application No. 19906094.8 (Aug. 25, 2022).
European Patent Office, Extended European Search Report in European Patent Application No. 21824768.2 (May 21, 2024).
European Patent Office, Extended European Search Report in European Patent Application No. 21827046.0 (May 21, 2024).
Intellectual Property India, Examination Report in Indian Patent Application No. 202147031787 (Nov. 15, 2022).
Intellectual Property India, Hearing Notice in Indian Patent Application No. 202147031787 (Sep. 5, 2023).
Intellectual Property India, Examination Report in Indian Patent Application No. 202147031791 (Jan. 2, 2023).
Intellectual Property India, Examination Report in Indian Patent Application No. 202147031796 (Oct. 21, 2022).
Intellectual Property India, Examination Report in Indian Patent Application No. 202147031803 (Jan. 4, 2023).
Intellectual Property India, Hearing Notice in Indian Patent Application No. 202147031803 (Feb. 1, 2024).
Intellectual Property India, Examination Report in Indian Patent Application No. 202147031909 (Nov. 15, 2022).
Intellectual Property India, Hearing Notice in Indian Patent Application No. 202147031909 (Jul. 4, 2023).
Japan Patent Office, International Search Report in International Patent Application No. PCT/JP2019/049806 (Feb. 10, 2020).
Japan Patent Office, International Search Report in International Patent Application No. PCT/JP2019/049807 (Feb. 10, 2020).
Japan Patent Office, International Search Report in International Patent Application No. PCT/JP2019/049808 (Feb. 10, 2020).
Japan Patent Office, International Search Report in International Patent Application No. PCT/JP2019/049809 (Feb. 10, 2020).
Japan Patent Office, International Search Report in International Patent Application No. PCT/JP2019/049810 (Feb. 10, 2020).
Japan Patent Office, International Search Report in International Patent Application No. PCT/JP2021/011661 (Jun. 15, 2021).
Japan Patent Office, International Search Report in International Patent Application No. PCT/JP2021/021948 (Aug. 31, 2021).
Japan Patent Office, International Search Report in International Patent Application No. PCT/JP2021/021951 (Aug. 31, 2021).
Japan Patent Office, International Search Report in International Patent Application No. PCT/JP2022/024733 (Aug. 9, 2022).
Korean Intellectual Property Office, Notification of Reason for Refusal in Korean Patent Application No. 10-2021-7023344 (Mar. 4, 2022).
Korean Intellectual Property Office, Office Action in Korean Patent Application No. 10-2021-7023373 (Oct. 25, 2024).
Korean Intellectual Property Office, Office Action in Korean Patent Application No. 10-2021-7023374 (Oct. 28, 2024).
Korean Intellectual Property Office, Notification of Reason for Refusal in Korean Patent Application No. 10-2021-7023397 (Mar. 4, 2022).
Korean Intellectual Property Office, Notification of Reason for Refusal in Korean Patent Application No. 10-2021-7023399 (Mar. 7, 2022).
Taiwan Intellectual Property Office, Office Action in Taiwanese Patent Application No. 108147639 (May 9, 2023).
Taiwan Intellectual Property Office, Office Action in Taiwanese Patent Application No. 108147653 (Jun. 8, 2023).
Taiwan Intellectual Property Office, Office Action in Taiwanese Patent Application No. 108147566 (Jul. 20, 2023).
Taiwan Intellectual Property Office, Office Action in Taiwanese Patent Application No. 110121798 (Oct. 11, 2024).
Taiwan Intellectual Property Office, Office Action in Taiwanese Patent Application No. 110121813 (Oct. 11, 2024).
Taiwan Intellectual Property Office, Office Action in Taiwanese Patent Application No. 113101002 (May 31. 2024).
European Patent Office, Communication pursuant to Article 94(3) EPC in European Patent Application No. 19901456.4 (Feb. 20, 2025).
U.S. Appl. No. 17/997,948, filed Nov. 4, 2022.
Korean Intellectual Property Office, Office Action in Korean Patent Application No. 10-2022-7034281 (Aug. 20, 2025).
China National Intellectual Property Administration, Office Action in Chinese Patent Application No. 202280049664.X (Jul. 31, 2025).
Intellctual Property India, Examination Report in Indian Patent Application No. 202247057178 (Nov. 4, 2025).
China National Intellectual Property Administration, Office Action in Chinese Patent Application No. 202280049664.X (Nov. 18, 2025).
China National Intellectual Property Administration, Office Action in Chinese Patent Application No. 202180044338.5 (Jan. 9, 2026).
China National Intellectual Property Administration, Office Action in Chinese Patent Application No. 202311338063.3 (Dec. 30, 2025).
Intellectual Property India, Examination Report in Indian Patent Application No. 202347001352 (Jan. 27, 2026).
Korean Intellectual Property Office, Office Action in Korean Patent Application No. 10-2023-7043630 (Feb. 5, 2026).

* cited by examiner

[FIG. 1]
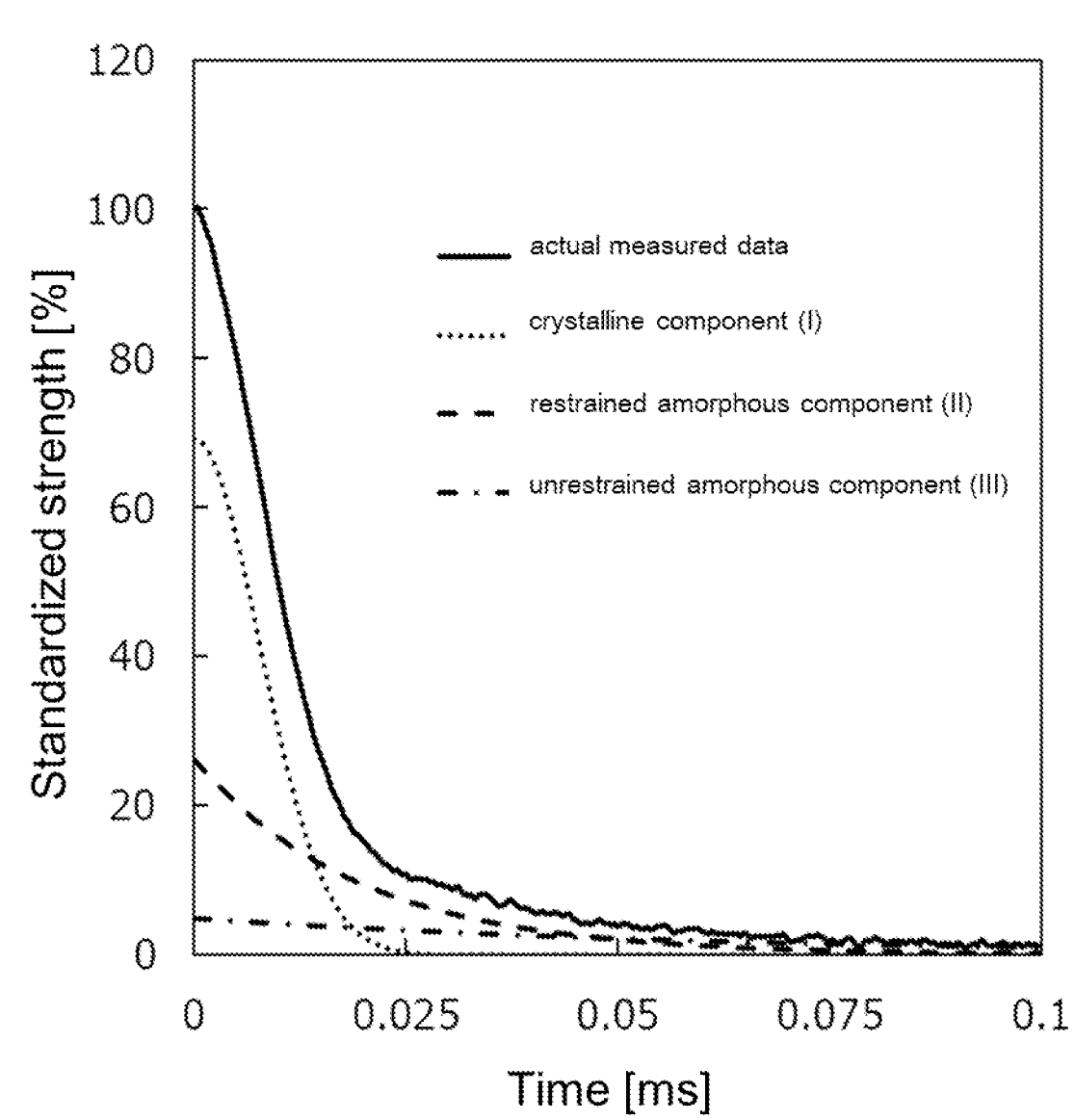

[FIG. 2]
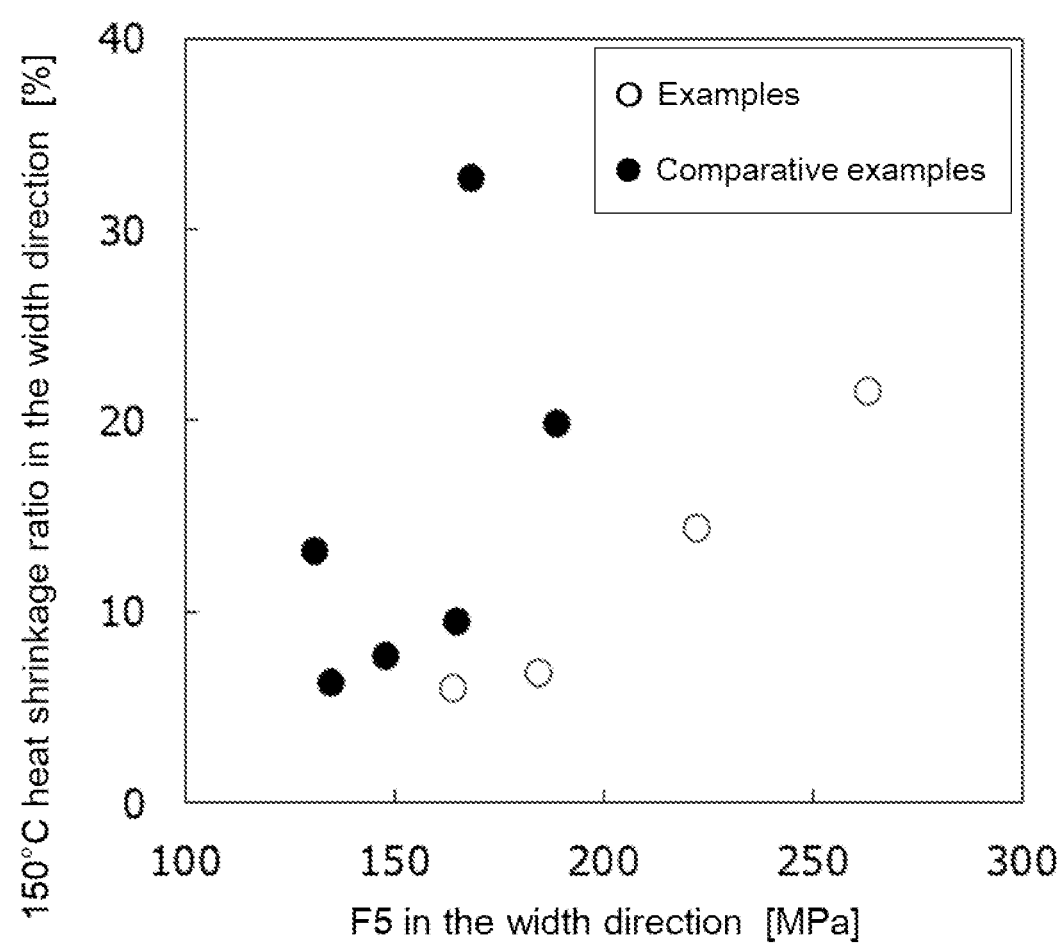

BIAXIALLY ORIENTED POLYPROPYLENE FILM

TECHNICAL FIELD

The present invention relates to a biaxially oriented polypropylene film superior in stiffness and heat resistance. More specifically, the present invention relates to a biaxially oriented polypropylene film that can easily retain a bag shape when being made into a packaging bag, and has fewer wrinkles at the sealed portion when being heat-sealed, and thus is suitable for use as a packaging bag.

BACKGROUND ART

A biaxially oriented polypropylene film is used for packaging and industrial applications since it has moisture resistance and also has required stiffness and heat resistance. In recent years, in consideration of the environment, it is required to maintain the strength even if the volume thereof is reduced (the film thickness becomes thinner), and for that purpose, it is crucial to significantly improve the stiffness. As a means for improving the stiffness, methods are known including improving the crystallinity and melting point of a polypropylene resin thanks to improvement of catalysts and the process technology at the time of polymerization of the polypropylene resin, and increasing the degree of orientation of the film by increasing stretch ratio in the process of forming the film. However, because improved stiffness leads to deteriorated heat resistance, no biaxially oriented polypropylene film with sufficient stiffness and heat resistance has been obtained. In addition, a film having reduced volume with improved stiffness leads to lower barrier properties against water vapor to impair moisture-proof properties, resulting in a problem of food deterioration.

In the manufacturing process of a biaxially oriented polypropylene film, a method in which after the film is stretched in the width direction, the film is heat treated in the first step while relaxing the film below the temperature at the time of stretching in the width direction, and then the film is heat treated in the second step at a temperature from the temperature in the first step to the temperature in the stretching in the width direction (for example, Patent document 1), and a method in which the film is stretched in the width direction, and further stretched in the longitudinal direction (for example, Patent documents 2 and 3) has been proposed. However, although the film disclosed in the Patent document 2 was superior in stiffness, it tended to wrinkle at the sealed portion after being heat-sealed and was inferior in heat resistance. The film disclosed in the Patent document 1 has low orientation and insufficient stiffness. The film disclosed in the Patent document 3 was sequentially biaxially oriented so that it was oriented in the width direction and re-oriented in the longitudinal direction, and therefore, the molecular chains were not sufficiently aligned in the longitudinal direction and the stiffness in the longitudinal direction was low. In addition, since it is relaxed in the width direction, the orientation in the width direction is low and the stiffness is insufficient.

RELATED ART DOCUMENT

Patent Document

Patent document 1: WO2016/182003
Patent document 2: JP 2013-177645 A
Patent document 3: JP 2001-40111 A

SUMMARY OF THE INVENTION

Problems to be Solved by the Invention

The objective of the present invention is to solve the above-mentioned problems. Namely, it relates to a biaxially oriented polypropylene film having both film stiffness and heat resistance at temperatures as high as 150° C. In detail, it is to provide a biaxially oriented polypropylene film that has high stiffness and can easily retain a bag shape when being made into a packaging bag even if the film is made thinner, and at the same time, that can maintain water vapor barrier properties even if the film is made thinner, and has few wrinkles in and around the sealed portion when being heat-sealed to make a packaging body.

Means for Solving the Problems

The present inventors have conducted earnest studies in order to accomplish the objective, and have found that a biaxially oriented polypropylene film that is superior in film stiffness, heat resistance at temperatures as high as 150° C., and water vapor barrier properties can be obtained by satisfying the following (1) and (2):

- (1) a half width of a peak derived from an oriented crystal in a width direction in angular dependency of a (110) plane of polypropylene α-type crystal obtained by wide-angle X-ray diffraction measurement is 260 or smaller;
- (2) the ratio of an unrestrained amorphous component (III) to the total of a crystalline component (I), a restrained amorphous component (II), and the unrestrained amorphous component (III) classified by pulse NMR according to solid-echo method is 7% or lower.

In this case, preferably, the following (3), (4), and (5) are satisfied:

- (3) a heat shrinkage ratio at 150° C. in a longitudinal direction is 10% or lower, and a heat shrinkage ratio at 150° C. in the width direction is 30% or lower;
- (4) a stress upon 5% elongation at 23° C. in the width direction is 140 MPa or more;
- (5) the heat shrinkage ratio (%) at 150° C. in the width direction and the stress (MPa) upon 5% elongation at 23° C. in the width direction satisfy the following formula.

$$\text{Stress(MPa)upon5\% elongation at 23° C. in the width direction} \geq \text{Heat shrinkage ratio (\%) at 150° C. in the width direction} \times 4.0 + 140$$

Furthermore, in this case, the following (6) and (7) are preferably satisfied:

- (6) a heat shrinkage ratio at 120° C. in a longitudinal direction is 2.0% or lower, and a heat shrinkage ratio at 120° C. in the width direction is 10.0% or lower;
- (7) the heat shrinkage ratio (%) at 120° C. in the width direction and a tensile elastic modulus (GPa) at 23° C. in the width direction satisfy the following formula.

$$\text{Tensile elastic modulus (GPa) at 23° C. in the width direction} \geq \text{Heat shrinkage ratio (\%) at 120° C. in the width direction} \times 0.3 + 7.0$$

Furthermore, in this case, the biaxially oriented polypropylene film preferably has a refractive index Ny in the longitudinal direction of 1.5250 or higher and ΔNy of 0.0240 or higher.

Furthermore, in this case, the biaxially oriented polypropylene film preferably has a haze of 5.0% or lower Furthermore, in this case, a polypropylene resin constituting the biaxially oriented polypropylene film preferably has a mesopentad fraction of 97.0% or higher.

Furthermore, in this case, a polypropylene resin constituting the biaxially oriented polypropylene film preferably has a crystallization temperature of 105° C. or higher and a melting point of 161° C. or higher.

Furthermore, in this case, a polypropylene resin constituting the biaxially oriented polypropylene film preferably has a melt flow rate of 4.0 g/10 min or higher.

Furthermore, in this case, an amount of a component having a molecular weight of 100,000 or less in a polypropylene resin constituting the biaxially oriented polypropylene film is preferably 35% by mass or more.

Effects of the Invention

The biaxially oriented polypropylene film of the present invention has high stiffness and can be made into a thin film, and at the same time, can maintain water vapor barrier properties even if the film is made thinner, and has few wrinkles in and around the sealed portion when being heat-sealed. Accordingly, it can be suitably used for packaging and industrial applications.

BRIEF DESCRIPTION OF THE DRAWINGS

FIG. 1 is a schematic view of component separation of decay curves of the spin-spin relaxation time observed in $^1$H-pulse NMR.

FIG. 2 is a graph comparing the examples and comparative examples for F5 and 150° C. heat shrinkage ratio in the width direction.

MODE FOR CARRYING OUT THE INVENTION

Hereinafter, a biaxially oriented polypropylene film of the present invention will be described in more detail.

The biaxially oriented polypropylene film of the present invention is made of a polypropylene resin composition containing a polypropylene resin as a main component. The "main component" means that the proportion of the polypropylene resin in the polypropylene resin composition is 90% by mass or more, more preferably 93% by mass or more, even more preferably 95% by mass or more, and particularly preferably 97% by mass or more.

(Polypropylene Resin)

As the polypropylene resin used in the present invention, a polypropylene homopolymer or a copolymer of ethylene and/or α-olefin having 4 or more carbon atoms can be used. A propylene homopolymer that substantially does not contain ethylene and/or α-olefin having 4 or more carbon atoms is preferable, and even in the case where ethylene and/or α-olefin component having 4 or more carbon atoms is contained, the amount of the ethylene and/or α-olefin component having 4 or more carbon atoms is preferably 1% by mole or less, more preferably 0.5% by mole or less, even more preferably 0.3% by mole or less, and particularly preferably 0.1 by mole or less. The amount in the above range can easily improve crystallinity. Examples of the α-olefin component having 4 or more carbon atoms constituting the copolymer, for example, include 1-butene, 1-pentene, 3-methylpentene-1,3-methylbutene-1,1-hexene, 4-methylpentene-1,5-ethylhexene-1,1-octene, 1-decene, 1-dodecene, 1-tetradecene, 1-hexadecene, 1-heptadecene, 1-octadecene, and 1-eicosene.

As the polypropylene resin, two or more different polypropylene homopolymers, copolymers of ethylene and/or α-olefin having 4 or more carbon atoms, and a mixture thereof can be used.

(Stereoregularity)

The mesopentad fraction (hereinafter, sometimes abbreviated as [mmmm]%), which is an index of the stereoregularity of the polypropylene resin used in the present invention, is preferably in the range of 97.0 to 99.9%, more preferably in the range of 97.5 to 99.7%, even more preferably 98.0 to 99.5%, and particularly preferably 98.5 to 99.3%.

When the mesopentad fraction is 97.0% or higher, the crystallinity of the polypropylene resin is improved, and the melting point, the degree of crystallinity, and the degree of crystal orientation of crystals in the film are improved, making it easier to obtain stiffness and heat resistance at high temperatures. A mesopentad fraction of 99.9% or lower is cost-effective in terms of polypropylene production, and easily prevent or reduce film breakage during film formation. The mesopentad fraction is measured by the nuclear magnetic resonance method (so-called NMR method).

The mesopentad fraction is more preferably 99.5% or lower. The mesopentad fraction is measured by the nuclear magnetic resonance method (so-called NMR method).

In order to keep the mesopentad fraction of the polypropylene resin within the above range, methods such a method in which obtained polypropylene resin powder is washed with a solvent such as n-heptane, or a method in which selection of a catalyst and/or co-catalyst and selection of components of the polypropylene resin composition are made as appropriate are preferably employed.

(Melting Temperature)

The lower limit of the melting temperature (Tm), measured by a DSC, of the above polypropylene resin constituting the biaxially oriented polypropylene film of the present invention is preferably 160° C., more preferably 161° C., even more preferably 162° C., further preferably 163° C., and even further preferably 164° C. When the Tm of 160° C. or higher, stiffness and heat resistance at high temperatures can be easily ensured. The upper limit of the Tm is preferably 170° C., more preferably 169° C., even more preferably 168° C., further preferably 167° C., and particularly preferably 166° C. When the Tm is 170° C. or lower, it is easier to prevent an increase in cost in terms of polypropylene production and the film is less likely to break during film formation. The melting temperature can be further increased by blending a crystal nucleating agent into the abovementioned polypropylene resin.

The Tm is the main peak temperature of an endothermic peak associated with melting that is observed when a sample with a weight of 1 to 10 mg is put into an aluminum pan, which is set in a differential scanning calorimeter (DSC), melted at 230° C. for 5 minutes in a nitrogen atmosphere, and the temperature is decreased to 30° C. at a scanning rate of −10° C./min, maintained for 5 minutes, and then increased at a scanning rate of 10° C./min.

(Crystallization Temperature)

The lower limit of the crystallization temperature (Tc), measured by a DSC, of the above polypropylene resin constituting the biaxially oriented polypropylene film of the present invention is 105° C., preferably 108° C., and more preferably 110° C. When the Tc is 105° C. or higher, crystallization can easily progress during stretching in the width direction and a subsequent cooling step, so that stiffness and heat resistance at high temperatures are easily ensured. The upper limit of the Tc is preferably 135° C., more preferably 133° C., even more preferably 132° C., further preferably 130° C., particularly preferably 128° C., and most preferably 127° C. When the Tc is 135° C. or lower, it is easier to prevent an increase in cost in terms of polypropylene production and the film is less likely to break during film formation. The crystallization temperature can be further increased by blending a crystal nucleating agent into the above-mentioned polypropylene resin.

The Tc is the main peak temperature of an exothermic peak that is observed when a sample with a weight of 1 to 10 mg is put into an aluminum pan, which is set in a DSC, melted at 230° C. for 5 minutes in a nitrogen atmosphere, and the temperature is decreased to 30° C. at a scanning rate of −10° C./min.

(Melt Flow Rate)

The melt flow rate (MFR) of the above polypropylene resin constituting the biaxially oriented polypropylene film of the present invention is preferably 4.0 to 30 g/10 min, more preferably 4.5 to 25 g/10 min, even more preferably 4.8 to 22 g/10 min, particularly preferably 5.0 to 20 g/10 min, and most preferably 6.0 to 20 g/10 min, when being measured in accordance with the condition M (230° C., 2.16 kgf) of JIS K7210 (1995).

When the melt flow rate (MFR) of the polypropylene resin is 4.0 g/10 min or higher, a biaxially oriented polypropylene film having low heat shrinkage is easily obtained.

When the melt flow rate (MFR) of the polypropylene resin is 30 g/10 min or lower, the film formability is easily maintained.

From the viewpoint of film characteristics, the lower limit of the melt flow rate (MFR) (230° C., 2.16 kgf) of the polypropylene resin constituting the film is preferably 5.0 g/10 min, more preferably 5.5 g/10 min, even more preferably 6.0 g/10 min, particularly preferably 6.3 g/10 min, and most preferably 6.5 g/10 min.

When the melt flow rate (MFR) of the polypropylene resin is 5.0 g/10 min or more, the amount of a low-molecular weight component in the polypropylene resin constituting the film is increased, so that by employing the width-direction stretching step in the film formation process described below, the orientation crystallization of the polypropylene resin is further promoted, and the degree of crystallinity in the film is more easily increased, and at the same time, the polypropylene molecular chains in the amorphous part are less entangled with each other to further improve heat resistance.

In order to keep the melt flow rate (MFR) of the polypropylene resin within the above range, it is preferable to employ methods such as controlling the average molecular weight or molecular weight distribution of the polypropylene resin.

That is, the lower limit of the amount of a component having a molecular weight of 100,000 or less in a GPC integration curve of the polypropylene resin constituting the film of the present invention is preferably 35% by mass, more preferably 38% by mass, even more preferably 40% by mass, further preferably 41% by mass, and particularly preferably 42% by mass.

The upper limit of the amount of the component having a molecular weight of 100,000 or less in the GPC integration curve is preferably 65% by mass, more preferably 60% by mass, and even more preferably 58% by mass. When the amount of the component having a molecular weight of 100,000 in the GPC curve is 65% by mass or less, the film strength is less likely to be decreased.

At this time, when a high-molecular-weight component or a long-chain branched component having a long relaxation time is contained, it is easy to adjust the amount of the component having a molecular weight of 100,000 or less contained in the polypropylene resin without significantly changing the overall viscosity, so that the film formability can be easily improved without significantly affecting the stiffness and heat shrinkage.

(Molecular Weight Distribution)

The lower limit of mass-average molecular weight (Mw)/number-average molecular weight (Mn), which is an index of the width of the molecular weight distribution, of the polypropylene resin used in the present invention is preferably 3.5, more preferably 4, even more preferably 4.5, and particularly preferably 5. The upper limit of the Mw/Mn is preferably 30, more preferably 25, even more preferably 23, particularly preferably 21, and most preferably 20.

The Mw/Mn can be obtained by using gel permeation chromatography (GPC). When the Mw/Mn is within the above range, it is easy to increase the amount of the component having a molecular weight of 100,000 or less.

The molecular weight distribution of the polypropylene resin can be adjusted by polymerizing components having different molecular weights in multiple stages in a series of plants, blending components having different molecular weights offline with a kneader, blending catalysts having different properties and performing polymerization, or using a catalyst capable of achieving a desired molecular weight distribution. The shape of the molecular weight distribution obtained by GPC may be a gentle molecular weight distribution with a single peak or may be a molecular weight distribution with multiple peaks and shoulders in a GPC chart in which the logarithm of molecular weight (M) (log M) is plotted on the horizontal axis and a differential distribution value (weight fraction per log M) is plotted on the vertical axis.

(Method for Forming Biaxially Oriented Polypropylene Film)

The biaxially oriented polypropylene film of the present invention is preferably obtained by producing an unstretched sheet made of the polypropylene resin composition containing the above-described polypropylene resin as a main component, and then biaxially stretching the unstretched sheet. The method for biaxial stretching may be any of an inflation simultaneous biaxial stretching method, a tenter simultaneous biaxial stretching method, and a tenter sequential biaxial stretching method, but the tenter sequential biaxial stretching method is preferably adopted from the viewpoint of film formation stability and thickness uniformity. In particular, stretching in the longitudinal direction followed by stretching in the width direction is preferred, but the method in which stretching in the width direction is followed by stretching in the longitudinal direction is also acceptable.

Next, a method for producing the biaxially oriented polypropylene film of the present invention will be described below, but the present invention is not necessarily limited thereto. The biaxially oriented polypropylene film of the present invention may have a layer having other functions laminated on at least one side. The lamination can be on one or both sides. In this case, the above-described polypropylene resin composition may be adopted as the resin composition of another layer or a central layer. Alternatively, a composition different from the above-described polypropylene resin composition may be used.

The number of the layer to be laminated may be one, two, or three or more per one surface but is preferably one or two from the viewpoint of production. As the method for the lamination, for example, coextrusion by a feed block method or a multi-manifold method is preferable. In particular, for the purpose of improving the processability of the biaxially oriented polypropylene film, a resin layer having heat-sealing properties can be laminated to the extent that the properties are not reduced. In addition, in order to impart printability, corona treatment can be performed on one or both surfaces.

The following is an example of the single layer case where the a tenter sequential biaxial stretching method is employed.

First, the resin composition containing the polypropylene resin is heated and melted with a uniaxial or biaxial extruder, extruded from a T-die into a sheet form, and brought into contact with a cooling roll to be cooled and solidified. For the purpose of promoting solidification, preferably, the sheet that has been cooled with the cooling roll may be further cooled by immersing it in a water tank or by other means.

Next, the sheet is stretched in the longitudinal direction with two pair of heated stretching rolls by increasing the number of rotations of the rear stretching rolls to obtain a uniaxially stretched film.

Subsequently, the uniaxially stretched film is pre-heated, and then stretched in the width direction at a specific temperature while gripping the film edges in a tenter-type stretching machine to obtain a biaxially stretched film. This width-direction stretching step will be described in detail later.

After the width-direction stretching step is completed, the biaxially stretched film is heat-treated at a specific temperature to obtain a biaxially oriented film. In the heat treatment step, the film may be relaxed in the width direction.

The biaxially oriented polypropylene film thus obtained can be subjected to, for example, a corona discharge treatment on at least one surface thereof, as necessary, and then wound by a winder to obtain a film roll.

Hereinafter, each step will be described in detail.
(Extrusion Step)

First, the polypropylene resin composition containing the polypropylene resin as a main component is heated and melted in the range of 200° C. to 300° C. with a uniaxial or biaxial extruder, and the melted polypropylene resin composition is extruded from a T-die into a sheet shape, which is brought into contact with a cooling roll made of metal to be cooled and solidified. The obtained unstretched sheet is preferably further put into a water tank.

The temperature of the cooling roll, or the temperature of the cooling roll and the water tank are preferably in the range of 10° C. to the Tc, and when the transparency of the film is to be increased, the sheet is preferably cooled and solidified with a cooling roll whose temperature is within the range of 10 to 50° C. When the cooling temperature is 50° C. or lower, the transparency of the unstretched sheet is likely to be increased, and the cooling temperature is preferably 40° C. or lower, and even more preferably 30° C. or lower. In order to increase the degree of crystal orientation after the sequential biaxial stretching, it may be preferable to set the cooling temperature to be 40° C. or higher, however, when a propylene homopolymer having a mesopentad fraction of 97.0% or higher as described above is used, the cooling temperature is preferably 40° C. or lower for facilitating stretching in the next step and reducing thickness unevenness, and more preferably 30° C. or lower.

The thickness of the unstretched sheet is preferably 3500 m or less in terms of cooling efficiency, more preferably 3000 m or less, and can be appropriately adjusted in accordance with the film thickness after the sequential biaxial stretching. The thickness of the unstretched sheet can be controlled by the extrusion speed of the polypropylene resin composition, the lip width of the T-die, and the like.
(Longitudinal-Direction Stretching Step)

The lower limit of a longitudinal-direction stretching ratio is preferably 3.5 times, more preferably 3.8 times, and particularly preferably 4.2 times. The above range can easily lead to higher strength and reduced thickness unevenness.

The upper limit of the longitudinal-direction stretching ratio is preferably 7.0 times, more preferably 6.0 times, and particularly preferably 7 times. The above range can make it easier to stretch in the width direction in the width-direction stretching step, resulting in improved productivity.

The lower limit of the longitudinal-direction stretching temperature is preferably Tm-30° C., more preferably Tm-27° C., and even more preferably Tm-25° C. The above range can make the subsequent width-direction stretching easier, and lead to reduced thickness unevenness. The upper limit of the longitudinal-direction stretching temperature is preferably Tm-7° C., more preferably Tm-10° C., and even more preferably Tm-12° C. The above range makes it easier to reduce the heat shrinkage ratio, and also prevent the sheet from adhering to the stretching roll to reduce the difficulty of stretching, and prevent degradation of quality due to larger surface roughness.

The longitudinal-direction stretching may be performed in two or more multiple stages using three or more pairs of stretching rolls.
(Preheating Step)

Before the width-direction stretching step, the uniaxially stretched film after the longitudinal-direction stretching needs to be heated in the range of Tm to Tm+25° C. to soften the polypropylene resin composition. When the preheating temperature is Tm or higher, softening proceeds and the stretching in the width direction becomes easy. When the preheating temperature is Tm+25° C. or lower, orientation at the time of the width-direction stretching proceeds to easily ensure stiffness. The preheating temperature is more preferably Tm+2 to Tm+20° C., and particularly preferably Tm+3 to Tm+15° C. The maximum temperature in the preheating step is defined as the preheating temperature.
(Width-Direction Stretching Step)

A preferable method for the width-direction stretching step after the preheating step is as follows.

In the width-direction stretching step, the temperature is preferably Tm-10° C. or higher and the preheating temperature or lower. The width-direction stretching may be started when the temperature arrives at the preheating temperature, or may be started when the temperature is lowered to a temperature lower than the preheating temperature after arriving at the preheating temperature.

The lower limit of the temperature in the width-direction stretching step is more preferably Tm-9° C., even more preferably Tm-7° C., and particularly preferably Tm-5° C. The width-direction stretching temperature within the above range can easily improve the stiffness of the obtained biaxially oriented film.

The upper limit of the temperature in the width-direction stretching step is preferably Tm+10° C., more preferably Tm+7° C., and particularly preferably Tm+5° C. The width-direction stretching temperature within the above range can easily prevent stretching unevenness.

In the width-direction stretching step, a later stretching step at a lower temperature may be added following the width-direction stretching at a temperature in the above range.

In other words, a section (first term section) in which stretching is performed at a temperature of Tm-10° C. or higher and Tm+10° C. or lower may be followed by a section (second term section) in which stretching is performed at a temperature that is lower than the temperature in the first term section and Tm−70° C. or higher and Tm−5° C. or lower. Performing the first term section and the second term section can easily improve the stiffness.

The lower limit of the stretching temperature of the second term section is preferably Tm−65° C., more preferably Tm−60° C., and even more preferably Tm−55° C. The stretching temperature in the second term section within the above range can easily lead to stable film production.

The lower limit of the final ratio of the width-direction stretching in the width-direction stretching step is preferably 10 times or more, more preferably 11 times or more, and even more preferably 11.5 times or more. When the ratio is 10 times or more, film stiffness can be easily improved and thickness unevenness can be easily reduced, and in addition, water vapor transmission ratio can be easily reduced. The upper limit of the ratio of the width-direction stretching is preferably 20 times, more preferably 17 times, and even more preferably 15 times. When the ratio is 20 times or less, heat shrinkage ratio can be easily reduced, and the film is less likely to break during stretching.

When the second term section is added, the total stretching ratio should be in the above range. In this case, the lower limit of stretching ratio in the first term section is preferably 4 times, more preferably 5 times, even more preferably 6 times, and particularly preferably 6.5 times. The upper limit of stretching ration at the end of the first term section is preferably 15 times, more preferably 14 times, and even more preferably 13 times.

Preferably, the film is cooled at the end of the width-direction stretching, i.e., immediately after reaching the final stretching ratio in the width-direction. At this time, the cooling temperature is preferably the width-direction stretching temperature or lower, and at the same time, Tm−80° C. or higher and Tm−15° C. or lower, more preferably Tm−80° C. or higher and Tm−20° C. or lower, even more preferably Tm−80° C. or higher and Tm−30° C. or lower, and particularly preferably Tm−70° C. or higher and Tm−40° C. or lower. By adding the cooling step, crystallization occurs and crystal orientation is fixed, and even if the temperature is subsequently increased above melting, the orientation history is maintained, resulting in a larger crystal orientation in the film.

From the temperature at the end of the width-direction stretching to the temperature when cooling, the temperature may be gradually decrease, or may be decreased stepwise or in one step. Decreasing the temperature stepwise or in one step is preferred because it is easier to further improve crystal orientation in the film.

After the film is cooled, it is preferred to stretch the film again in the width direction at a high temperature (hereinafter, also referred to as width-direction re-stretching). Stretching the film in the width direction again at a high temperature after cooling the film makes it easier to improve crystal orientation of the film, thus making it easier to increase the stiffness and lower the water vapor transmission ratio. The lower limit of the stretching temperature when re-stretching in the width direction is Tm−5° C., preferably Tm° C., more preferably Tm+5° C., even more preferably Tm+7° C., and particularly preferably Tm+9° C. The temperature of Tm−5° C. or higher can easily improve the stiffness and reduce the heat shrinkage ratio.

The upper limit of the temperature in the width-direction re-stretching is preferably Tm+20° C., more preferably Tm+18° C., and even more preferably Tm+16° C. The temperature of Tm+20° C. or lower can easily improve the stiffness.

The lower limit of the re-stretching ratio in the width direction at a high temperature is preferably 1.05 times, more preferably 1.1 times, and even more preferably 1.15 times.

The upper limit of the stretching ratio in the width-direction re-stretching at a high temperature is preferably 2 times, more preferably 1.7 times, and even more preferably 1.5 times. If the re-stretching ratio is too large, the heat shrinkage ratio may become too large, thickness unevenness may occur, or the film may break.

The inventors have found that by stretching in the width direction again at a high temperature, rather than immediately relaxing at a high temperature after stretching in the width direction as in conventional methods, it is possible to further improve the stiffness while decreasing the heat shrinkage ratio.

In the step of re-stretching in the width direction at a high temperature, it is preferable to perform stretching at Tm−5° C. or higher. When the temperature is Tm−5° C. or higher, the kinetic properties of molecular chains are sufficiently high, and stretching helps to dissolve the effects of entanglement of the molecular chains, resulting in the molecular chains less restrained, which is less likely to lead to a disordered molecular orientation, and crystallization is also sufficiently advanced.

Cooling the film at the same or below the crystallizable temperature after stretching in the width direction at a high temperature can fix the crystal orientation, so that a film having a high degree of crystallinity and thick crystal lamella, and high melting point can be obtained.

In addition, also outside the crystal lamella, there are few molecular chains with large distortion of molecular orientation restrained by entanglement points, and the film is unlikely to shrink even if melting of the crystals begins. Furthermore, with increased crystallinity and thicker crystal lamella, the melting point tends to be higher, and melting is less likely to occur at a temperature that is the same or below the melting point. This is easily leads to decreased heat shrinkage ratio.

As a result, the heat shrinkage ratio can be reduced while the stiffness is further improved.

In a usual film production process (extruding—longitudinal-direction stretching—width-direction stretching—heat treatment), in order to eliminate distortion caused by the width-direction stretching performed at a temperature lower than the melting point, the film was exposed to a high temperature the same as or higher than the melting point in the heat treatment process, and at the same time the film was relaxed by several percent to several tens of percent to reduce the heat shrinkage ratio. The relaxation can eliminate the difficulty of crystallization progress due to restrained molecular chains, and contribute to the reduction of heat shrinkage ratio. Conversely, however, it was difficult to achieve both low heat shrinkage ratio and high stiffness because the stiffness also decreased due to the reduced orientation in the width direction of the molecular chains generated in the width-direction stretching process. In addition, if the temperature was too high, there was also the problem of whitening of the film.

In a usual film production process (extruding—longitudinal-direction stretching—width-direction stretching—heat treatment), if stretching is performed by increasing the temperature of the width-direction stretching process so that the molecular chains are highly mobile and no strain remains, melting of the crystals generated by the longitudinal-direction stretching progress to decrease crystal orientation.

In the method of the present invention, the film is once stretched in the width direction and sufficiently oriented in the width direction, and then the crystal orientation is fixed by cooling, so that the film has sufficient tension even after melting, and there is little concern about thickness unevenness or film breaking when the film is re-stretched at a temperature as high as Tm−5° C. or higher because the film has sufficient tension at the time of the re-stretching.

The stretching ratio at a high temperature only needs to be the one that is sufficient to loosen molecular chain entanglements and align the molecular chains, and may be 1.05 times or more. A stretching ratio of 2 times or less is less likely to lead to thickness unevenness.

As such, by using the polypropylene resin having high stereoregularity, a high melting point, and high crystallinity as described above and employing the above-described longitudinal-direction stretching step, the width-direction stretching step, the cooling step, and the stretching step at a high temperature, the molecules of the polypropylene resin are highly aligned in a main orientation direction (in the above-described with-direction stretching step, corresponding to the width direction), and thus, the crystal orientation in the obtained biaxially oriented film is strong, and more crystals having a high melting point are likely to be generated.

In addition, by increasing the amount of the low-molecular-weight component of the polypropylene resin, the molecular chains become less entangled, which makes it easier to increase the crystallinity of the film and reduce the part that is not crystal lamella. Furthermore, the heat contraction stress at the part that is not crystal lamella is weakened, making it easier to further reduce the heat shrinkage ratio.

In the conventional technology, it was difficult to achieve both strong crystal orientation and low amount of amorphous component that is not restrained by crystals. In other words, if either stiffness or heat shrinkage ratio improves, the other property tends to decrease. Considering these, it can be said that the present invention has an epoch-making effect.

(Heat Treatment Step)

The biaxially stretched film can be heat-treated as necessary in order to further reduce the heat shrinkage ratio. The upper limit of the heat treatment temperature is preferably the above-described high-temperature re-stretching temperature, more preferably the high-temperature re-stretching temperature−2° C., and even more preferably the high-temperature re-stretching temperature−3° C. By keeping the temperature that is the same or lower than the high-temperature re-stretching temperature, the stiffness is less likely to be reduced, the film surface roughness is less likely to become too large, and the film is less likely to whiten. The lower limit of the heat treatment temperature is preferably Tm−3° C., more preferably Tm−2° C., and particularly preferably Tm.

For the purpose of adjusting the heat shrinkage ratio, the film may be relaxed in the width direction during the heat treatment. The upper limit of the relaxation rate is preferably 5%, more preferably 3%, and even more preferably 1%. With the relaxation rate within the above range, the stiffness is less likely to be reduced and the film thickness fluctuation is likely to be reduced. When more stiffness is desired, the heat treatment does not need to be performed.

(Cooling Step)

After the width-direction stretching, the film is preferably cooled immediately after re-stretching in the width direction at Tm−5° C. or higher or immediately after the heat treatment step. At this time, the cooling temperature is preferably 10° C. or higher and 140° C. or lower, more preferably 20° C. or higher and 120° C. or lower, even more preferably 80° C. or lower, and particularly preferably 50° C. or lower. Providing the cooling step can fix the condition of the film.

(Film Thickness)

The thickness of the biaxially oriented polypropylene film of the present invention is determined according to each application, however, in order to ensure the strength of the film, the lower limit of the film thickness is preferably 2 m, more preferably 3 m, even more preferably 4 m, particularly preferably 8 m, and most preferably 10 μm. When the film thickness is 2 m or more, the stiffness of the film can be easily ensured. The upper limit of the film thickness is preferably 100 m, more preferably 80 m, even more preferably 60 m, particularly preferably 50 am, and most preferably 40 am. When the film thickness is 100 m or less, the cooling rate of the unstretched sheet during the extrusion step is less likely to be decreased.

The biaxially oriented polypropylene film of the present invention is usually formed as a roll having a width of 2000 to 12000 mm and a length of about 1000 to 50000 m, and is wound into a film roll, which is further slit according to each application and is provided as a slit roll having a width of 300 to 2000 mm and a length of about 500 to 5000 m. The biaxially oriented polypropylene film of the present invention can be obtained as a longer film roll.

(Thickness Uniformity)

The lower limit of the thickness uniformity of the biaxially oriented polypropylene film of the present invention is preferably 0%, more preferably 0.1%, even more preferably 0.5%, and particularly preferably 1%. The upper limit of the thickness uniformity is preferably 20%, more preferably 17%, even more preferably 15%, particularly preferably 12%, and most preferably 10%. When the thickness uniformity is within the above range, defects are less likely to occur during post-processing such as coating and printing, and the biaxially oriented polypropylene film can be easily used for applications that require precision.

The measurement method is as follows. A test piece of 40 mm in the width direction is cut out from a steady region where the physical properties of the film are stable in the longitudinal direction, and the film thickness is continuously measured over 20000 mm using a film feeder manufactured by MIKURON k.k. (serial number: A90172) and a film thickness continuous measurement device (product name: K-313A wide-range high-sensitivity electronic micrometer) manufactured by Anritsu Corporation, and the thickness uniformity is calculated from the following equation.

$$\text{Thickness uniformity (\%)} = [(\text{maximum value of thickness} - \text{minimum value of thickness})/\text{average value of thickness}] \times 100$$

(Film Characteristics)

The biaxially oriented polypropylene film of the present invention is characterized by the following characteristics. Here, the "longitudinal direction" in the biaxially oriented polypropylene film of the present invention is a direction corresponding to a flow direction in the film production process, and the "width direction" is a direction orthogonal to the flow direction in the film production process. For a polypropylene film for which the flow direction in the film production process is unknown, a direction with the highest diffraction intensity of a diffraction intensity distribution obtained when wide-angle X-rays incident perpendicularly on the film surface and a scattering peak derived from the (110) plane of α-type crystal is scanned in the circumferential direction is defined as the "longitudinal direction", and a direction orthogonal to this direction is defined as the "width direction".

(Crystalline Component (I), Restrained Amorphous Component (II), Unrestrained Amorphous Component (III) Obtained from Pulse NMR)

The decay time constant of Free Induction Decay (FID) of the spin-spin relaxation time T2 observed in $^1$H-pulse NMR is known to be observed as the sum of two or more decay time constants. For example, according to Polymer Journal, Vol. 3, No. 4, pp 448-462 (1972), the decay time constant of the relaxation time of a crystalline polymer was analyzed as the sum of three components: crystalline component, intermediate phase component, and amorphous component, using the solid-echo method of pulse NMR.

The spin-spin relaxation time T2 observed in $^1$H-pulse NMR slows down in the order of crystalline, intermediate, and amorphous phase. The intermediate phase has a faster T2 than the amorphous phase, and is considered to be amorphous with restrained mobility. When stretching while unraveling the entanglement of molecular chains, a crystalline component (I) with strong orientation is formed, and an amorphous chain component (II) (corresponding to the above intermediate phase) with restrained mobility is formed near the crystal. On the other hand, if the entanglement is large and the orientation is disordered during stretching, an amorphous component (III) (corresponding to the above amorphous phase), which is not restrained by crystals, is easily generated. The unrestrained amorphous component (III) has high mobility, and it tends to move to eliminate strain at high temperatures, which is thought to be the cause of shrinkage at high temperatures. Compared to the amorphous component (III), the restrained amorphous chains (II) are thought to be less likely to shrink at high temperatures because their motion is inhibited even at high temperatures.

The biaxially oriented polypropylene film of the present invention has the upper limit of the unrestrained amorphous component (III) obtained from pulse NMR is 7%, preferably 6%, and more preferably 5%.

When the amorphous component (III) is 7% or less, wrinkles during heat sealing are less likely to occur, and distortion when fusing a chuck portion to the opening is small, which is desirable. From the viewpoint of water vapor barrier properties, the amorphous component (III) is even more preferably 4% or less, and particularly preferably 3% or less.

In order to reduce the unrestrained amorphous component (III), it is particularly effective to increase the area multiplier during film formation, and to stretch the film again in the width direction at a high temperature after sequential biaxial stretching.

It is also effective to use polypropylene materials with a high mesopentad fraction.

Furthermore, it is effective to set the lower limit of the amount of components having a molecular weight of 100,000 or less when a gel permeation chromatography (GPC) curve of the polypropylene resin constituting the film is measured to be 35% by mass.

The unrestrained amorphous component (III) obtained from pulse NMR of 7% or less means that there are few molecular chains with high molecular orientation distortion restrained by entanglement points, and even when crystals begin to melt, the film is resistant to shrinkage, and thus the film is less likely to wrinkle when heat-sealed at a high temperature.

If the unrestrained amorphous component (III) obtained from pulse NMR is more than 7%, the film is prone to wrinkling when heat-sealed due to the large number of molecular chains with high molecular orientation distortion restrained by entanglement points resulting in shrinkage as soon as the crystals start melting.

The lower limit of the unrestrained amorphous component (III) is not particularly limited, however, it is practical to be 0.1% or more, and may be 0.5% or more. If the unrestrained amorphous component (III) is reduced to less than 0.1%, it is necessary to stretch the film in the width direction again at a high temperature after sequential biaxial stretching, which may cause a decrease in tension during stretching due to melting, resulting in breakage of the film. In addition, the crystal orientation in the film may become weaker, resulting in lower stiffness.

The heat shrinkage ratio (%) at 150° C. in the width direction and the stress (MPa) upon 5% elongation at 23° C. in the width direction of the biaxially oriented polypropylene film of the present invention satisfy the following formula.

Satisfying the following formula results in higher stiffness and lower heat shrinkage ratio at high temperatures, which improve the ease of maintaining the bag shape when made into a packaging bag, and also improve packaging quality as the film is less prone to deformation during processing such as heat sealing at high temperatures. In addition, the film can be made thinner, contributing to a reduction in the volume of packaging materials.

$$\text{Stress (MPa) upon 5\% elongation at 23° C. in the width direction} \geq \text{Heat shrinkage ratio (\%) at 150° C. in the width direction} \times 4.0 + 140$$

In addition, the heat shrinkage ratio (%) at 150° C. in the width direction and the stress (MPa) upon 5% elongation at 23° C. in the width direction of the biaxially oriented polypropylene film of the present invention preferably satisfy the following formula.

$$\text{Stress (MPa) upon 5\% elongation at 23° C. in the width direction} \geq \text{Heat shrinkage ratio (\%) at 150° C. in the width direction} \times 4.0 + 150$$

Furthermore, even preferably, the heat shrinkage ratio (%) at 150° C. in the width direction and the stress (MPa) upon 5% elongation at 23° C. in the width direction of the biaxially oriented polypropylene film of the present invention satisfy the following formula.

$$\text{Stress (MPa) upon 5\% elongation at 23° C. in the width direction} \geq \text{Heat shrinkage ratio (\%) at 150° C. in the width direction} \times 4.0 + 160$$

(Heat Shrinkage Ratio at 150° C.)

The upper limit of the heat shrinkage ratio at 150° C. in the longitudinal direction of the biaxially oriented polypropylene film of the present invention is 10%, preferably 7.0%, more preferably 6.0%, even more preferably 5.0%, and particularly preferably 4.0%. The upper limit of the heat shrinkage ratio at 150° C. in the width direction is 30%, preferably 20%, more preferably 16%, particularly preferably 15% or lower, most preferably 12 or lower, and particularly most preferably 9% or lower.

When the heat shrinkage ratio in the longitudinal direction is 10% or lower and the heat shrinkage ratio in the width direction is 30% or lower, wrinkles during heat sealing are less likely to occur. In particular, when the heat shrinkage ratio at 150° C. in the longitudinal direction is 8.0% or lower and the heat shrinkage ratio at 150° C. in the width direction is 15% or lower, it is preferable because distortion when fusing a chuck portion to the opening is small. In order to decrease the heat shrinkage ratio at 150° C., it is effective to set the lower limit of the amount of components having a molecular weight of 100,000 or less when a gel permeation chromatography (GPC) curve of the polypropylene resin constituting the film is measured to be 35% by mass.

(F5: Stress Upon 5% Elongation at 23° C.)

The lower limit of F5 at 23° C. in the width direction of the biaxially oriented polypropylene film of the present invention is 140 MPa, preferably 160 MPa, more preferably 180 MPa, even more preferably 190 MPa, and most preferably 200 MPa or more. When being 140 MPa or more, the stiffness is high, making it easier to maintain a bag shape when made into a packaging bag and less likely to cause deformation of the film during printing and other processing.

The upper limit of F5 at 23° C. in the width direction is preferably 300 MPa, more preferably 290 MPa, and even more preferably 280 MPa. When being 280 MPa or less, practical manufacture becomes easier and the longitudinal-width balance is likely to be improved.

The lower limit of F5 at 23° C. in the longitudinal direction of the biaxially oriented polypropylene film of the present invention is preferably 40 MPa, more preferably 42 MPa, even more preferably 46 MPa, and particularly preferably 48 MPa. When being 40 MPa or more, the stiffness is high, making it easier to maintain a bag shape when made into a packaging bag and less likely to cause deformation of the film during printing and other processing.

The upper limit of F5 at 23° C. in the longitudinal direction is preferably 70 MPa, more preferably 65 MPa, even more preferably 62 MPa, and particularly preferably 60 MPa. When being 70 MPa or less, practical manufacture becomes easier and the longitudinal-width balance is likely to be improved.

The F5 can be set within the range by adjusting the stretching ratio and relaxation ratio, or adjusting the temperature when the film is formed.

The biaxially oriented polypropylene film of the present invention preferably has the following characteristics and configuration.

(Heat Shrinkage Ratio at 120° C.)

The upper limit of the heat shrinkage ratio at 120° C. in the longitudinal direction of the biaxially oriented polypropylene film of the present invention is preferably 2.0%, more preferably 1.5%, even more preferably 1.2% and particularly preferably 1.0%. When being 2.0% or lower, a printing pitch shift is less likely to occur when printing ink is transferred. The upper limit of the heat shrinkage ratio at 120° C. in the width direction is 10.0% or lower, preferably 5.0%, more preferably 3.5%, and particularly preferably 2.5%. When being 10.0% or lower, wrinkles are less likely to be generated when heat sealed. The lower limit of the heat shrinkage ratio at 120° C. is not particularly limited, however, is practically 0% or higher.

The heat shrinkage ratio at 120° C. can be brought within the range by adjusting the stretching ratio, stretching temperature, and heat setting temperature.

The heat shrinkage ratio (%) at 120° C. in the width direction and the tensile elastic modulus (GPa) at 23° C. in the width direction of the biaxially oriented polypropylene film of the present invention preferably satisfy the following formula.

Satisfying the following formula results in higher stiffness and lower heat shrinkage ratio at high temperatures, which prevents or reduces printing pitch shift when being made into a packaging bag.

Tensile elastic modulus (GPa) at 23° C. in the width direction≥Heat shrinkage ratio (%) at 120° C. in the width direction×0.3+7.0 In addition, more preferably, the heat shrinkage ratio (%) at 120° C. in the width direction and the tensile elastic modulus (GPa) at 23° C. in the width direction of the biaxially oriented polypropylene film of the present invention satisfy the following formula.

Tensile elastic modulus (GPa) at 23° C. in the width direction≥Heat shrinkage ratio (%) at 120° C. in the width direction×0.3+8.0

Furthermore, even more preferably, the heat shrinkage ratio (%) at 120° C. in the width direction and the tensile elastic modulus (GPa) at 23° C. in the width direction of the biaxially oriented polypropylene film of the present invention satisfy the following formula.

Tensile elastic modulus (GPa) at 23° C. in the width direction≥Heat shrinkage ratio (%) at 120° C. in the width direction×0.3+9.0

(Tensile Elastic Modulus at 23° C.)

The lower limit of the tensile elastic modulus at 23° C. in the longitudinal direction of the biaxially oriented polypropylene film of the present invention is 2.0 GPa, preferably 2.1 GPa, more preferably 2.2 GPa, even more preferably 2.3 GPa, particularly preferably 2.4 GPa, and most preferably 2.6 GPa. When being 2.0 GPa or more, the stiffness is high, making it easier to maintain a bag shape when being made into a packaging bag and less likely to cause deformation of the film during printing and other processing. The upper limit of the tensile elastic modulus in the longitudinal direction is preferably 4.0 GPa, more preferably 3.8 GPa, even more preferably 3.7 GPa, particularly preferably 3.6 GPa, and most preferably 3.5 GPa. When being 4.0 GPa or less, practical manufacture becomes easier and the longitudinal-width balance in characteristics is likely to be improved.

The lower limit of the tensile elastic modulus at 23° C. in the width direction of the biaxially oriented polypropylene film of the present invention is preferably 6.0 GPa, more preferably 6.5 GPa, more preferably 6.7 GPa, even more preferably 7.0 GPa, particularly preferably 8.0 GPa, and most preferably 8.5 GPa. When being 6.0 GPa or more, the stiffness is high, making it easier to maintain a bag shape when being made into a packaging bag and less likely to cause deformation of the film during printing and other processing. The upper limit of the tensile elastic modulus in the width direction is preferably 15 GPa, more preferably 13 GPa, and even more preferably 12 GPa. When being 15 GPa or less, practical manufacture becomes easier and the longitudinal-width balance in characteristics is likely to be improved.

The tensile elastic modulus can be brought within the range by adjusting the stretching ratio and relaxation ratio, or adjusting the temperature when the film is formed.

(Tensile Breaking Strength at 23° C.)

The lower limit of the tensile breaking strength at 23° C. in the longitudinal direction of the biaxially oriented polypropylene film or the present invention is preferably 90 MPa, more preferably 100 MPa, even more preferably 110 MPa, and particularly preferably 115 MPa. When being 90 MPa or more, printing pitch shift is less likely to occur when printing ink is transferred, and the durability of a packaging bag is easily improved. The upper limit of the tensile breaking strength in the longitudinal direction, as a realistic value, is preferably 200 MPa, more preferably 180 MPa, and even more preferably 160 MPa. When being 200 MPa or less, film breakage and packaging bag breakage are less likely to occur.

The lower limit of the tensile breaking strength at 23° C. in the width direction of the biaxially oriented polypropylene film of the present invention is preferably 400 MPa, more preferably 420 MPa, even more preferably 440 MPa, and particularly preferably 450 MPa. When being 400 MPa or more, printing pitch shift is less likely to occur when printing ink is transferred, and the durability of a packaging bag is easily improved. The upper limit of the tensile breaking strength in the width direction, as a realistic value, is preferably 650 MPa, more preferably 600 MPa, and even more preferably 550 MPa. When being 650 MPa or less, film breakage and packaging bag breakage are less likely to occur.

The tensile breaking strength can be brought within the range by adjusting the stretching ratio, stretching temperature, and heat setting temperature.

(Tensile Elongation at Break at 23° C.)

The lower limit of the tensile elongation at break at 23° C. in the longitudinal direction of the biaxially oriented polypropylene film of the present invention is preferably 180%, more preferably 190%, more preferably 200%, and particularly preferably 210%. When being 180% or more, film breakage and packaging bag breakage are less likely to occur. The upper limit of the tensile elongation at break at 23° C. in the longitudinal direction, as a realistic value, is preferably 300%, and more preferably 280%.

The lower limit of the tensile elongation at break at 23° C. in the width direction of the biaxially oriented polypropylene film of the present invention is preferably 15%, more preferably 20%, and more preferably 30%. When being 15% or more, film breakage and packaging bag breakage are less likely to occur. The upper limit of the tensile elongation at break at 23° C. in the width direction is preferably 60%, more preferably 55%, and even more preferably 50%. When being 60% or lower, printing pitch shift is less likely to occur when printing ink is transferred, and the durability of a packaging bag is easily improved.

The tensile elongation at break can be brought within the range by adjusting the stretching ratio, stretching temperature, and heat setting temperature.

(Refractive Index)

The lower limit of the refractive index (Nx) in the longitudinal direction of the biaxially oriented polypropylene film of the present invention is preferably 1.4950, more preferably 1.4970, even more preferably 1.4980, particularly preferably 1.4990, and most preferably 1.5000. When being 1.4950 or higher, the film stiffness can be easily improved. The upper limit of the refractive index (Nx) in the longitudinal direction is preferably 1.5100, more preferably 1.5070, and even more preferably 1.5050. When being 1.5100 or lower, the longitudinal-width balance in characteristics is likely to be improved.

The lower limit of the refractive index (Ny) in the width direction of the biaxially oriented polypropylene film of the present invention is 1.5250, preferably 1.5253, more preferably 1.5255, even more preferably 1.5260, and particularly preferably 1.5265. When being 1.5250 or higher, the film stiffness can be easily improved. The upper limit of the refractive index (Ny) in the width direction is preferably 1.5280, more preferably 1.5275, and even more preferably 1.5270. When being 1.5280 or lower, the longitudinal-width balance in characteristics is likely to be improved.

The lower limit of the refractive index (Nz) in the thickness direction of the biaxially oriented polypropylene film of the present invention is preferably 1.4960, more preferably 1.4965, even more preferably 1.4970, particularly preferably 1.4980, and most preferably 1.4990. When being 1.4960 or higher, the film stiffness can be easily improved. The upper limit of the refractive index (Nz) in the thickness direction is preferably 1.5020, more preferably 1.5015, and even more preferably 1.5010. When being 1.5020 or lower, the heat resistance of the film can be easily improved.

The refractive index can be brought within the range by adjusting the stretching ratio, stretching temperature, and heat setting temperature.

($\Delta$Ny)

The lower limit of the $\Delta$Ny of the biaxially oriented polypropylene film of the present invention is 0.0240, preferably 0.0245, more preferably 0.0247, even more preferably 0.0250, particularly preferably 0.0255, and most preferably 0.0260. When being 0.0240 or higher, the film stiffness can be easily improved. The upper limit of the $\Delta$Ny, as a realistic value, is preferably 0.0280, more preferably 0.0277, even more preferably 0.0273, and particularly preferably 0.0270. When being 0.0280 or lower, thickness unevenness can be easily improved. The $\Delta$Ny can be brought within the range by adjusting the stretching ratio, stretching temperature, and heat setting temperature of the film.

The $\Delta$Ny is calculated by the following equation in which Nx, Ny, and Nz are the refractive indexes in the longitudinal direction, the width direction, and the thickness direction, respectively, and means the degree of orientation in the width direction with respect to the entire orientation in the longitudinal direction, the width direction, and the thickness direction of the film.

$$\Delta Ny = Ny - [(Nx + Nz)/2]$$

(Plane Orientation Coefficient)

The lower limit of the plane orientation coefficient ($\Delta$P) of the biaxially oriented polypropylene film of the present invention is preferably 0.0135, more preferably 0.0138, and even more preferably 0.0140. When being 0.0135 or higher, the balance in the surface direction of the film is good, and the thickness unevenness is also good. The upper limit of the plane orientation coefficient ($\Delta$P), as a realistic value, is preferably 0.0155, more preferably 0.0152, and even more preferably 0.0150. When being 0.0155 or lower, it is easy for the film to have excellent heat resistance at high temperatures. The plane orientation coefficient ($\Delta$P) can be brought within the range by adjusting the stretching ratio, stretching temperature, and heat setting temperature.

The plane orientation coefficient ($\Delta$P) is calculated using the equation $\Delta P = [(Nx + Ny)/2] - Nz$.

(Average Refractive Index)

The lower limit of the average refractive index of the biaxially oriented polypropylene film of the present invention is preferably 1.5080, more preferably 1.5081, even more preferably 1.5082, particularly preferably 1.5083, and most preferably 1.5090. The upper limit of the average refractive index, as a realistic value, is preferably 1.5150, more preferably 1.5140, even more preferably 1.5135, and particularly preferably 1.5130. When being 1.5080 or higher, wrinkles are less likely to be generated when heat sealed. The average refractive index can be brought within the range by adjusting the stretching ratio, stretching temperature, and heat setting temperature of the film.

The average refractive index is calculated by the following equation in which Nx, Ny, and Nz are the refractive indexes in the longitudinal direction, the width direction, and the thickness direction of the film, respectively.

$$\text{Average refractive index} = (Nx + Ny + Nz)/3$$

(Haze)

The upper limit of the haze of the biaxially oriented polypropylene film of the present invention is preferably 5.0%, more preferably 4.5%, even more preferably 4.0%, particularly preferably 3.5%, and most preferably 3.0%. When being 5.0% or lower, the film can be easily used for applications that require transparency. The lower limit of the haze, as a realistic value, is preferably 0.1%, more preferably 0.2%, even more preferably 0.3%, and particularly preferably 0.4%. When being 0.1% or higher, the film can be easily produced. The haze can be brought within the range by adjusting the cooling roll (CR) temperature, width-direction stretching temperature, preheating temperature before tenter stretching in the width direction, width-direction stretching temperature, or heat setting temperature, or the amount of the component having a molecular weight of 100,000 or less in the polypropylene resin, however, may be increased by adding an anti-blocking agent or providing a seal layer.

(Half Width of Diffraction Peak Derived from Oriented Crystals)

In the angular dependency of a scattering peak of the (110) plane of polypropylene α-type crystal obtained by measurement with wide-angle X-rays incident perpendicularly on the film surface, the upper limit of the half width (Wh) of a diffraction peak derived from the oriented crystals in the width direction of the biaxially oriented polypropylene film of the present invention is 26°, preferably 250 or smaller, more preferably 240 or smaller, particularly preferably 23° or smaller, most preferably 22.0° or smaller, and particularly most preferably 21.0° or smaller. When the half width (Wh) is 26° or smaller, the film stiffness can be easily improved, and water vapor transmission ratio can be easily decreased. The lower limit of the Wh is preferably 15°, more preferably 16°, and even more preferably 17°.

(Degree of X-Ray Orientation)

The lower limit of the degree of X-ray orientation calculated by the following equation from the Wh of the biaxially oriented polypropylene film of the present invention is preferably 0.856, more preferably 0.861, even more preferably 0.867, particularly preferably 0.872, and most preferably 0.878. When being 0.856 or higher, the stiffness can be easily improved.

$$\text{Degree of X-Ray Orientation} = (180 - Wh)/180$$

The upper limit of the degree of X-ray orientation is preferably 0.917, more preferably 0.911, and even more preferably 0.906. A degree of X-ray orientation of 0.917 or lower can easily lead to stable film production.

(Water Vapor Transmission Ratio)

The water vapor transmission ratio of the biaxially oriented polypropylene film of the present invention is preferably 5.0 g/m²·d or less in terms of 20 m thickness, more preferably 4.6 g/m²·d or less, and even more preferably 4.3 g/m²·d or less. When being 5.0 g/m²·d or less, it is easy to obtain enough water vapor barrier properties even if the film is made thinner because the film has water vapor barrier properties superior to conventional films at the same thickness.

(Practical Characteristics of Film)

Practical characteristics the biaxially oriented polypropylene film of the present invention has will be described.

(Stiffness and Water Vapor Barrier Properties)

Packaging materials used for packaging foods, beverages, and other products are required to have high barrier properties for the purpose of maintaining the quality and quantity of the contents, in addition to functions such as stiffness and heat resistance, in order to protect the contents from various types of distribution, storage including chilled storage, and processing such as heat sterilization, and the materials are required to be superior in such characteristics even when it is made thinner.

(Wrinkles During Heat Sealing)

To form a bag for packaging food products, a pre-made bag is filled with the contents and heated to melt and fuse the film, thereby hermetically sealing the bag. In many cases, the same procedure is also performed when making a bag while filling the bag with food. Usually, a sealant film made of polyethylene, polypropylene, or the like is laminated on a base film, and the surfaces of the sealant film are fused to each other. As for a heating method, the film is pressed by applying pressure with a heating plate from the base film side to seal the film, and the sealing width is usually about 10 mm. At this time, the base film is also heated, and the shrinkage at this time causes wrinkles. For the durability of the bag, it is better to have fewer wrinkles, and in order to increase purchasing motivation, it is also better to have fewer wrinkles. The sealing temperature may be as high as 120° C., however, a higher sealing temperature is required to increase the bag-making processing speed, and even then, the shrinkage should be small. When a chuck is fused to the opening of the bag, sealing at an even higher temperature is required.

(Printing Pitch Shift)

As for the structure of a packaging film, as a basic structure, the packaging film is often composed of a laminated film of a printed base film and a sealant film. For producing a bag, a bag making machine is used, and various bag making machines are used for three-sided bags, standing bags, gusset bags, etc. It is considered that a printing pitch shift occurs because the base film elongates and contracts due to tension and heat being applied to the film during a printing step. Eliminating defective products due to a printing pitch shift is important in terms of effective use of resources, and it is also important in order to increase purchasing motivation.

(Film Processing)

The biaxially oriented polypropylene film of the present invention can be printed by letterpress printing, lithographic printing, intaglio printing, stencil printing, or transfer printing, depending on the application.

Moreover, an unstretched sheet, a uniaxially stretched film, or a biaxially stretched film each made of a low-density polyethylene, a linear low-density polyethylene, and ethylene-vinyl acetate copolymer, polypropylene, or polyester can be attached as a sealant film, and the biaxially oriented polypropylene film can be used as a laminated body to which heat sealability is imparted. Furthermore, in the case of enhancing the gas barrier properties and heat resistance, an unstretched sheet, a uniaxially stretched film, or a biaxially stretched film each made of aluminum foil, polyvinylidene chloride, nylon, an ethylene vinyl alcohol copolymer, or polyvinyl alcohol can be provided as an intermediate layer between the biaxially oriented polypropylene film and the sealant film. An adhesive applied by a dry lamination method or a hot melt lamination method can be used for attaching the sealant film.

In order to improve the gas barrier properties, aluminum or an inorganic oxide can be vapor-deposited on the biaxially oriented polypropylene film, the intermediate layer film, or the sealant film. As the vapor deposition method, vacuum vapor deposition, sputtering, and ion plating method can be adopted, and silica, alumina, or a mixture thereof is particularly preferably vacuum-deposited.

The biaxially oriented polypropylene film of the present invention can be made suitable for packaging fresh products including plants that require high freshness such as vegetables, fruits, and flowers by, for example, setting the amount of an antifogging agent, such as fatty acid esters of polyhydric alcohols, amines of higher fatty acids, amide of higher fatty acids, ethylene oxide adducts of amines and amides of higher fatty acids in the film to be in the range of 0.2 to 5% by mass.

Moreover, as long as the effect of the present invention is not impaired, various additives for improving quality such as slipperiness and antistatic properties, lubricants such as wax and metal soap for improving productivity, a plasticizer, a processing aid, a heat stabilizer, an antioxidant, an anti-static agent, and ultraviolet absorber, etc., for example, can be also blended.

EXAMPLES

Hereinafter, the present invention will be described in detail by way of Examples. The characteristics were measured and evaluated by the following methods.

(1) Melt Flow Rate

The melt flow rate (MFR) was measured at a temperature of 230° C. with a load of 2.16 kgf in accordance with JIS K7210.

(2) Mesopentad Fraction

The mesopentad fraction ([mmmm]%) of the polypropylene resin was measured using $^{13}$C-NMR. The mesopentad fraction was calculated according to the method described in Macromolecules, Vol. 6, P. 925 (1973) by Zambelli et. al. The $^{13}$C-NMR measurement was carried out at 110° C. with 200 mg of a sample being dissolved in an 8:2 mixed solution of o-dichlorobenzene and heavy benzene at 135° C., using AVANCE 500 manufactured by Bruker.

(3) Number-average molecular weight, weight-average molecular weight, amount of component having molecular weight of 100,000 or less, and molecular weight distribution of polypropylene resin Using gel permeation chromatography (GPC), the molecular weights were determined as PP-equivalent molecular weights on the basis of monodisperse polystyrene. When the baseline was not clear, a baseline was determined in a range to the lowest position of the skirt, on the high molecular weight side, of an elution peak on the high molecular weight side closest to the elution peak of the standard substance.

The GPC measurement conditions are as follows:

Equipment: HLC-8321PC/HT (manufactured by Tosoh Corporation),

Detector: RI,

Solvent: 1,2,4-trichlorobenzene+dibutylhydroxy-toluene (0.05%),

Column: TSK gel guard column HHR(30)HT (7.5 mmL.D.×7.5 cm)×1+TSK gel GMHHR-H(20)HT (7.8 mmL.D.×30 cm)×3, Flow rate: 1.0 mL/min, Injection volume: 0.3 mL, Measurement temperature: 140° C.

The number-average molecular weight (Mn) and the mass-average molecular weight (Mw) are defined by the following equations with the number of molecules ($N_i$) of a molecular weight ($M_i$) at each elution position of a GPC curve obtained via a molecular weight calibration curve, respectively.

Number-average molecular weight: $Mn=\Sigma(N_i \cdot M_i)/\Sigma N_i$

Mass-average molecular weight: $Mw=\Sigma(N_i \cdot M_i^2)/\Sigma (N_i \cdot M_i)$ The molecular weight distribution can be obtained by Mw/Mn.

The proportion of the component having a molecular weight of 100,000 or less was determined from the integral curve of the molecular weight distribution obtained by GPC.

(4) Crystallization Temperature (Tc) and Melting Temperature (Tm)

Heat measurement was performed in a nitrogen atmosphere using Q1000 differential scanning calorimeter manufactured by TA Instruments. Approximately 5 mg was cut out from polypropylene resin pellets and sealed in an aluminum pan for measurement. The temperature was raised to 230° C. and maintained for 5 minutes, and then lowered to 30° C. at a rate of −10° C./min, and the exothermic peak temperature was determined as the crystallization temperature (Tc). The heat quantity of crystallization (ΔHc) was determined by setting a baseline such that the area of the exothermic peak was smoothly connected from the start of the peak to the end of the peak. The temperature was maintained as it was 30° C. for 5 minutes, then raised to 230° C. at 10° C./min, and the main endothermic peak temperature was determined as the melting temperature (Tm).

(5) Film Thickness

The film thickness was measured using Millitron 1202D manufactured by Seiko EM.

(6) Haze

The haze was measured in accordance with JIS K7105 at 23° C. using NDH5000 manufactured by NIPPON DENSHOKU INDUSTRIES CO., LTD.

(7) Tensile Test

The tensile strength in the longitudinal direction and the width direction of a film was measured at 23° C. in accordance with JIS K7127. A sample having a size of 15 mm×200 mm was cur out from the film, and set in a tensile tester (dual column desktop tester Instron 5965 manufactured by Instron Japan Company Limited) with a chuck width of 100 mm. A tensile test was performed at a tensile rate of 200 mm/min. From the obtained strain-stress curve, a tensile elastic modulus was determined from the gradient of a straight line portion at the initial stage of elongation, and stress upon 5% elongation was determined as F5.

The tensile breaking strength and tensile elongation at break were defined as the strength and elongation at the point at which the sample broke, respectively.

(8) Heat Shrinkage Ratio

The heat shrinkage ratio was measured by the following method in accordance with JIS Z1712. A film was cut into a width of 20 mm and a length of 200 mm in the longitudinal direction and the width direction of the film, respectively, hung in a hot air oven at 120° C. or 150° C. and heated for 5 minutes. The length after heating was measured, and the heat shrinkage ratio was calculated as the ratio of the shrunken length to the original length.

(9) Refractive index, ΔNy, plane orientation coefficient, and average refractive index Measurements were performed at a wavelength of 589.3 nm and a temperature of 23° C. using an Abbe refractometer manufactured by ATAGO CO., LTD. The refractive indices along the longitudinal direction and the width direction of a film were denoted by Nx and Ny, respectively, and the refractive index in the thickness direction was denoted by Nz. ΔNy was calculated by (formula) Ny−[(Nx+Nz)/2] using Nx, Ny, and Nz. The plane orientation coefficient (ΔP) was calculated using (formula) [(Nx+Ny)/2]−Nz. The average refractive index was calculated using (formula) (Nx+Ny+Nz)/3.

(10) X-Ray Half Width, and Degree of X-Ray Orientation

Measurement was performed by a transmission method using an X-ray diffractometer (SmartLab αβγ attachment included, manufactured by Rigaku Corporation). X-rays having a wavelength of 1.5418 Å were used, with an X-ray output of 45 kV, 200 mA. As a detector, a hybrid multidimensional pixel detector Hypix-3000 was used in 0-dimensional mode. As a slit on the incident side by the parallel beam method, a solar slit of 2.5°, a longitudinal limiting slit of 10 mm, and an incident slit width of 1 mm were used. As a slit on the receiving side, a parallel slit analyzer 0.228° was used.

The camera length was 300 mm, and the detector integration width was 2 mm.

A sample was prepared by laminating a film such that the thickness was 400 μm. The detector was placed at the diffraction peak position of the (110) plane of the α-type crystal of polypropylene resin (diffraction angle 2θ=14.1°). The sample was rotated 3600 around the film thickness direction to obtain the angular dependency of the diffraction intensity of the (110) plane. The step interval was 0.5° and the measurement speed was 60°/min. From the angular dependency, the half width Wh of the diffraction peak derived from the oriented crystals in the width direction of the film was obtained.

In addition, using Wh, the degree of X-ray orientation was calculated from the following equation.

$$\text{Degree of X-ray orientation}=(180-Wh)/180$$

(11) Ratio of Unrestrained Amorphous Component (III) Obtained from Pulse NMR

The film was cut into pieces and the pieces were packed into a glass tube with an outer diameter of 10 mm until the pieces became 1 cm high. The spin-spin relaxation time T2 of the $^1$H nucleus of the polypropylene film was measured under the following measuring apparatus and conditions to obtain a decay curve of magnetization intensity.

Equipment: Minispec mq20 manufactured by BRUKER
Temperature: 40° C.
Observation frequency: 20 MHz
900 pulse width: 2.74 μs
Pulse repetition time: 2.0 s
Pulse mode: Solido Echo method
Number of integration: 128 times
Recycle Delay: 4 s
Acquisition Scale: 0.1 ms The measurement was started after the glass tube that had been filled with the pieces of film was put into the equipment and kept warm for 15 minutes. Each ratio was obtained by separating the shortest component of relaxation time by the least-squares method using the Gaussian function and the second and third shortest components by the least-squares method using the Lorentz function so that the obtained decay curve of magnetization intensity matched the fitting curve. Note that the shortest component corresponds to the crystalline component (I), and the second and third shortest components correspond to the restrained amorphous component (II) and the unrestrained amorphous component (III), respectively. The fitting and analysis were performed using the software (TD-NMR Analyzer) provided with the above measurement equipment.

The ratio of the unrestrained amorphous component (III) to the total of the crystalline component (I), the restrained amorphous component (II), and the unrestrained amorphous component (III) obtained by the above method was calculated using the following equation (1).

$$\text{Ratio of the unrestrained amorphous component}$$
$$(III)=M_{III}/(M_I+M_{II}+M_{III}) \tag{1}$$

$M_I$: Amount of the crystalline component (I)
$M_{II}$: Amount of the restrained amorphous component (II)
$M_{III}$: Amount of the unrestrained amorphous component (III)

(12) Water Vapor Transmission Ratio

The water vapor transmission ratio was measured in accordance with JIS K7129 B method. The water vapor transmission ratio was measured under a temperature of 40° C. and a humidity of 90% RH using a water vapor transmission ratio measurement device (PERMATRAN-W3/33 manufactured by MOCON). Since the water vapor transmission ratio is inversely proportional to film thickness, the thickness of each sample to be measured was measured, and the water vapor transmission ratio was converted to a value at 20 μm.

Example 1

As a polypropylene resin, 80 parts by weight of propylene homopolymer PP-1 with MFR=7.5 g/10 min, [mmmm]=98.9%, Tc=116.2° C., and Tm=162.5° C. (SUMITOMO NOBLEN FLX80E4, manufactured by SUMITOMO CHEMICAL COMPANY) and 20 parts by weight of polypropylene homopolymer PP-2 with MFR=11 g/10 min, [mmmm]=98.8%, Tc=116.5° C., Tm=161.5° C. (EL80F manufactured by SUMITOMO CHEMICAL COMPANY) were blended and used.

The polypropylene resin was extruded into a sheet from a T-die at 250° C., brought into contact with a cooling roll set at 20° C., and put into a water tank set at 20° C. as it was. Subsequently, the sheet was stretched 4.5 times in the longitudinal direction with two pairs of rolls at 142° C., then both ends were gripped with clips, and the sheet was guided into a hot air oven and preheated at 170° C., and then stretched 10 times in the width direction at 162° C. as a first stage. Immediately after the stretching in the width direction, the film was cooled at 120° C. while gripped with clips, and then re-stretched 1.2 times in the width direction at 175° C. Finally, the film was cooled at a room temperature. The thickness of the resulting film was 18.6 μm.

Table 1 shows the structure of the polypropylene resin, and Table 2 shows the film forming conditions. As shown in Table 3, the physical properties of the obtained film were very excellent in stiffness and the film had a low thermal shrinkage at high temperatures. The film was also excellent in water vapor transmission ratio.

Example 2

The same procedure as in Example 1 was carried out except re-stretching 1.2 times in the width direction at 165° C. The thickness of the resulting film was 18.4 μm. Table 1 shows the structure of the polypropylene resin, and Table 2 shows the film forming conditions. As shown in Table 3, the physical properties of the obtained film were very excellent in stiffness and the film had a low thermal shrinkage at high temperatures. The film was also excellent in water vapor transmission ratio.

Example 3

The same procedure as in Example 1 was carried out except stretching in the longitudinal direction at 147° C., stretching 10 times in the width direction at 165° C. as the first stage, cooling at 120° C. while gripped with clips immediately after the stretching in the width direction, and then re-stretching 1.2 times in the width direction at 177° C. The thickness of the resulting film was 18.9 μm. Table 1 shows the structure of the polypropylene resin, and Table 2 shows the film forming conditions. As shown in Table 3, the film had a high stiffness and low thermal shrinkage ratio at high temperatures. In addition, the film was excellent in water vapor transmission ratio.

Example 4

The same procedure as in Example 3 was carried out except re-stretching 1.1 times in the width direction at 177° C. The thickness of the resulting film was 20.6 μm. Table 1 shows the structure of the polypropylene resin, and Table 2 shows the film forming conditions. As shown in Table 3, the film had a high stiffness and low thermal shrinkage ratio at high temperatures. In addition, the film was excellent in water vapor transmission ratio.

Comparative Example 1

The same procedure as in Example 1 was carried out except stretching 12 times in the width direction at 162° C. as the first stage, cooling at 100° C. while gripped with clips immediately after the stretching in the width direction, and then heat setting at 170° C. with constant width. The thickness of the resulting film was 20.8 μm.

Table 1 shows the structure of the polypropylene resin, and Table 2 shows the film forming conditions. As shown in Table 3, the physical properties of the obtained film were excellent in water vapor transmission ratio and high in stiffness, however, inferior in stiffness at high temperatures.

Comparative Example 2

The same procedure as in Example 1 was carried out except stretching 12 times in the width direction at 162° C. as the first stage, not cooling while gripped with clips immediately after the stretching in the width direction, and heat setting at 172° C. with constant width. The thickness of the resulting film was 23.1 μm.

Table 1 shows the structure of the polypropylene resin, and Table 2 shows the film forming conditions. As shown in Table 3, the physical properties of the obtained film were inferior in stiffness, and also inferior in water vapor transmission ratio.

Comparative Example 3

The same procedure as in Example 1 was carried out except stretching 12 times in the width direction at 168° C. as the first stage, cooling at 100° C. while gripped with clips immediately after the stretching in the width direction, and heat setting at 170° C. with constant width. The thickness of the resulting film was 18.7 μm.

Table 1 shows the structure of the polypropylene resin, and Table 2 shows the film forming conditions. As shown in Table 3, the physical properties of the obtained film were inferior in stiffness and high in heat shrinkage ratio at high temperatures, and also inferior in water vapor transmission ratio.

Comparative Example 4

As a polypropylene resin, PP-3(FL203D manufactured by Japan Polypropylene Corporation) with MFR=3 g/10 min,

[mmmm]=94.8%, Tc=117.2° C., and Tm=160.6° C. was used. The polypropylene resin was extruded into a sheet from a T-die at 250° C., brought into contact with a cooling roll set at 20° C., and put into a water tank set at 20° C. as it was. Subsequently, the sheet was stretched 4.5 times in the longitudinal direction at 130° C., and, with preheating temperature of 168° C., was stretched 8.2 times in the width direction at a tenter at 155° C. as the first stage. Immediately after the stretching in the width direction, the film was cooled at 120° C. while gripped with clips, and then re-stretched 1.2 times in the width direction at 170° C. Finally, the film was cooled at a room temperature. The thickness of the resulting film was 18.8 μm.

Table 1 shows the structure of the polypropylene resin, and Table 2 shows the film forming conditions. As shown in Table 3, the physical properties of the obtained film were inferior in stiffness and high in heat shrinkage ratio at high temperatures, and also inferior in water vapor transmission ratio.

Comparative Example 5

As in Example 1, a blend of PP-1 and PP-2 was used, and a film was obtained under the film forming conditions shown in Table 2, in which the film was not re-stretched in the width direction, and the film was heat treated at 168° C. The thickness of the resulting film was 20.0 μm.

Table 1 shows the structure of the polypropylene resin, and Table 2 shows the film forming conditions. As shown in Table 3, the obtained film has a low heat shrinkage ratio at high temperatures, however, was inferior in stiffness.

Comparative Example 6

As a polypropylene resin, PP-4 (SA4L manufactured by Japan Polypropylene Corporation) with MFR=5 g/10 min, [mmmm]=97.3%, Tc=116.8° C., and Tm=161.6° C. was used, and a film was obtained under the film forming conditions shown in Table 2, in which the film was not re-stretched in the width direction, and the film was heat treated at 168° C. The thickness of the resulting film was 20.0 μm.

Table 1 shows the structure of the polypropylene resin, and Table 2 shows the film forming conditions. As shown in Table 3, the obtained film has a low heat shrinkage ratio at high temperatures, however, was inferior in stiffness.

TABLE 1

| | PP-1 | PP-2 | PP-3 | PP-4 |
|---|---|---|---|---|
| MFR (g/10 min) | 7.5 | 11 | 3.0 | 5.0 |
| [mmmm] (%) | 98.9 | 98.8 | 94.8 | 97.3 |
| Melting temperature Tm (° C.) | 162.5 | 161.5 | 160.6 | 161.6 |
| Crystallization temperature Tm (° C.) | 116.2 | 116.5 | 117.2 | 116.8 |
| Heat quantity of crystallizaton ΔHc (J/g) | 104.8 | 107.8 | 94.9 | 106.8 |
| Amount of component having molecular weight of 10,000 or less (% by mass) | 4.0 | 6.9 | 3.0 | 5.0 |
| Amount of component having molecular weight of 100,000 or less (% by mass) | 40.5 | 53.1 | 37.1 | 47.0 |

TABLE 2

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Raw polypropylene resn | PP-1 | 80 | 80 | 80 | 80 | 80 | 80 | 80 | — | 80 | — |
| | PP-2 | 20 | 20 | 20 | 20 | 20 | 20 | 20 | — | 20 | — |
| | PP-3 | — | — | — | — | — | — | — | 100 | — | — |
| | PP-4 | — | — | — | — | — | — | — | — | — | 100 |
| Mixed polypropylene resn | Meltflow rate (g/10 min) | 8.5 | 8.5 | 8.5 | 8.5 | 8.5 | 8.5 | 8.5 | 3 | 8.5 | 5 |
| | Amount of component havng molecular weight of 100,000 or less (% by mass) | 43.0 | 43.0 | 43.0 | 43.0 | 43.0 | 43.0 | 43.0 | 37.1 | 43.0 | 47.0 |
| Extrusion step | Extrusion temperature (° C.) | 250 | 250 | 250 | 250 | 250 | 250 | 250 | 250 | 250 | 250 |
| | Cooling temperature (° C.) | 20 | 20 | 20 | 20 | 20 | 20 | 20 | 20 | 20 | 30 |
| Longitudinal-directon stretching step | Longitudinal-direction stretching temperature (° C.) | 142 | 142 | 147 | 147 | 142 | 142 | 142 | 130 | 143 | 135 |
| | Longitudinal-direction stretching ratio (times) | 4.5 | 4.5 | 4.5 | 4.5 | 4.5 | 4.5 | 4.5 | 4.5 | 4.5 | 4.5 |
| Preheatng step | Preheatng temperature (° C.) | 170 | 170 | 170 | 170 | 170 | 170 | 170 | 168 | 170 | 170 |
| Width-direction stretching step | Width-direction stretching temperature (° C.) | 162 | 162 | 165 | 165 | 162 | 162 | 168 | 155 | 158 | 160 |
| | Width-direction stretching ratio (times) | 10 | 10 | 10 | 10.9 | 12 | 12 | 12 | 8.2 | 8.2 | — |
| | Temperature immediately after the end of width-direction stretching (° C.) | 120 | 120 | 120 | 120 | 100 | 172 | 100 | 120 | 168 | 168 |
| | Width-direction re-stretching temperature (° C.) | 175 | 165 | 177 | 177 | — | — | — | 170 | — | — |
| | Width-direction re-stretchng ratio (times) | 1.2 | 1.2 | 1.2 | 1.1 | — | — | — | 1.2 | — | — |
| | Final width-directon stretching ratio (times) | 12.0 | 12.0 | 12.0 | 12.1 | 12.0 | 12.0 | 12.0 | 9.8 | 8.2 | 8.2 |
| Heat teatnent step | Heat treatment temperature (° C.) | — | — | — | — | 170 | 172 | 170 | — | 168 | 168 |
| | Relaxation rate during heat treatment (%) | — | — | — | — | 0 | 0 | 0 | — | 0 | 6.7 |

| | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|
| Thickness (μm) | 18.6 | 18.4 | 18.9 | 20.6 | 20.8 | 23.1 | 18.7 | 18.8 | 20.0 | 20.0 |
| Haze (%) | 1.2 | 1.3 | 0.8 | 0.8 | 0.9 | 1.5 | 1.1 | 0.6 | 1.1 | 2.5 |
| F5 (width-direction) (MPa) | 222 | 263 | 185 | 164 | 189 | 148 | 165 | 168 | 131 | 135 |
| F5 (longitudinal-direction) (MPa) | 46 | 46 | 49 | 50 | 49 | 47 | 44 | 40 | 44 | 49 |
| Tensile elastic modulus (width-direction) (GPa) | 8.1 | 9.7 | 7.7 | 7.3 | 7.1 | 5.7 | 6.8 | 5.2 | 5.7 | 5.0 |
| Tensile elastic modulus (longitudinal-direction) (GPa) | 2.4 | 2.5 | 2.8 | 2.9 | 2.8 | 2.3 | 2.6 | 2.0 | 2.6 | 2.8 |
| Tensile breaking strength (width-direction) (MPa) | 454 | 512 | 446 | 426 | 466 | 399 | 397 | 397 | 344 | 356 |
| Tensile breaking strength (longitudinal-direction) (MPa) | 101 | 103 | 116 | 120 | 124 | 130 | 107 | 136 | 124 | 134 |
| Tensile elongation at break (width-direction) (%) | 21 | 24 | 34 | 37 | 40 | 30 | 28 | 25 | 44 | 44 |
| Tensile elongation at break (longitudinal-direction) (%) | 211 | 216 | 245 | 220 | 239 | 270 | 239 | 231 | 219 | 216 |
| Heat shrinkage ratio at 120° C. (width-direction) (%) | 2.7 | 5.3 | 0.7 | 0.5 | 1.7 | 0.8 | 1.0 | 6.3 | 1.0 | 0.5 |
| Heat shrinkage ratio at 120° C. (longitudinal-direction) (%) | 0.0 | 0.0 | 0.7 | 0.8 | 0.3 | 1.3 | 0.0 | 2.8 | 1.3 | 1.3 |
| Heat shrinkage ratio at 150° C. (width-direction) (%) | 14.3 | 21.5 | 6.8 | 6.0 | 19.8 | 7.7 | 9.5 | 32.7 | 13.2 | 6.3 |
| Heat shrinkage ratio at 150° C. (longitudinal-direction) (%) | 2.7 | 3.5 | 3.0 | 6.0 | 4.5 | 3.5 | 2.7 | 10.3 | 4.3 | 4.0 |
| A: H Heat shrinkage ratio at 150° C. in the width direction (%) ×4.0 + 140 | 197 | 226 | 167 | 164 | 219 | 171 | 178 | 271 | 193 | 165 |
| F5 (width-direction) (MPa) -A | 25 | 37 | 17 | 0 | -30 | -23 | -13 | -102 | -62 | -30 |
| B: Heatshrinkage ratio at 120° C. in the width direction (%) × 0.3 + 7.0 | 7.8 | 8.6 | 7.2 | 7.2 | 7.5 | 7.2 | 7.3 | 8.9 | 7.3 | 7.2 |
| Tensile elastic modulus (width-direction) (MPa) -B | 0.3 | 1.1 | 0.5 | 0.1 | -0.4 | -1.5 | -0.5 | -3.7 | -1.6 | -2.2 |
| Refractive index N x in the longitudinal direction | 1.5018 | 1.4998 | 1.5024 | 1.5023 | 1.5011 | 1.5025 | 1.5035 | 1.4993 | 1.5056 | 1.5073 |
| Refractive index N y in the width direction | 1.5271 | 1.5264 | 1.5259 | 1.5256 | 1.5249 | 1.5259 | 1.5269 | 1.5211 | 1.5245 | 1.5260 |
| Refractive index N z in the thickness direction | 1.4997 | 1.4993 | 1.4997 | 1.4997 | 1.4990 | 1.5000 | 1.5012 | 1.4961 | 1.5010 | 1.5023 |
| ΔNy | 0.0264 | 0.0269 | 0.0248 | 0.0246 | 0.0248 | 0.0246 | 0.0246 | 0.0234 | 0.0212 | 0.0212 |
| Plane orientaton coefficient ΔP | 0.0147 | 0.0138 | 0.0145 | 0.0142 | 0.0139 | 0.0142 | 0.0140 | 0.0141 | 0.0141 | 0.0144 |
| Average refractive index | 1.5095 | 1.5085 | 1.5093 | 1.5092 | 1.5083 | 1.5095 | 1.5105 | 1.5055 | 1.5104 | 1.5118 |
| X-ray half width (°) | 18.1 | 18.0 | 20.6 | 20.4 | 20.1 | 21.3 | 22.0 | 25.3 | 28.9 | 27.0 |
| Degree of X-ray orientaton | 0.899 | 0.900 | 0.884 | 0.884 | 0.888 | 0.882 | 0.878 | 0.859 | 0.839 | 0.850 |
| Ratio crystalline comonent (I) (%) | 69.0 | 68.5 | 68.8 | 67.2 | 66.9 | 67.9 | 67.4 | 61.7 | 66.7 | 66.7 |
| Ratio of restrained amorphous component (II) (%) | 28.9 | 29.5 | 26.4 | 29.1 | 24.1 | 23.3 | 20.7 | 30.9 | 21.2 | 29.6 |
| Ratio of unrestrained amorphous component (III) (%) | 2.1 | 2.0 | 4.8 | 3.7 | 9.0 | 8.8 | 11.9 | 7.4 | 12.1 | 3.7 |
| Water vapor tansmission (g/m² · d/20 μm ) | 4.4 | 4.2 | 4.9 | 4.8 | 4.5 | 5.5 | 5.1 | 6.2 | 5.4 | 5.6 |

INDUSTRIAL APPLICABILITY

The biaxially oriented polypropylene film of the present invention can be used preferably for packaging bags because of its excellent properties not found in conventional films as described above, and the thickness of the film can be made thinner than before.

Furthermore, it is also suitable for applications used at high temperatures, such as insulating films for capacitors and motors, back sheets for solar cells, barrier films for inorganic oxides, and base films for transparent conductive films such as ITO, and for applications that require stiffness, such as separator films. In addition, coatings, inks, laminating adhesives, and the like, which have been difficult to use in the past, can be used to coat and print at high temperatures, which is expected to improve production efficiency.

The biaxially oriented polypropylene film of the present invention has high stiffness and can be made into a thin film, and at the same time can maintain the same gas barrier properties as conventional thicknesses even if the film is made thinner, and has few wrinkles in and around the sealed portion when being heat-sealed. Accordingly, it can be suitably used for applications such as packaging films and industrial films.

The invention claimed is:

1. A biaxially oriented polypropylene film, satisfying the following (1) and (2):
   (1) a half width of a peak derived from an oriented crystal in a width direction in angular dependency of a (110) plane of polypropylene a-type crystal obtained by wide-angle X-ray diffraction measurement is 26° or smaller;
   (2) the ratio of an unrestrained amorphous component (III) to the total of a crystalline component (I), a restrained amorphous component (II), and the unrestrained amorphous component (III) classified by pulse NMR according to solid-echo method is 7% or lower.

2. The biaxially oriented polypropylene film according to claim 1, further satisfying the following (3), (4), and (5):
   (3) a heat shrinkage ratio at 150° C. in a longitudinal direction is 10% or lower, and a heat shrinkage ratio at 150° C. in the width direction is 30% or lower;
   (4) a stress upon 5% elongation at 23° C. in the width direction is 140 MPa or more;
   (5) the heat shrinkage ratio (%) at 150° C. in the width direction and the stress (MPa) upon 5% elongation at 23° C. in the width direction satisfy the following formula:
   Stress (MPa) upon 5% elongation at 23° C. in the width direction≥Heat shrinkage ratio (%) at 150° C. in the width direction×4.0+140.

3. The biaxially oriented polypropylene film according to claim 1, further satisfying the following (6) and (7):
   (6) a heat shrinkage ratio at 120° C. in a longitudinal direction is 2.0% or lower, and a heat shrinkage ratio at 120° C. in the width direction is 10.0% or lower;
   (7) the heat shrinkage ratio (%) at 120° C. in the width direction and a tensile elastic modulus (GPa) at 23° C. in the width direction satisfy the following formula:
   Tensile elastic modulus (GPa) at 23° C. in the width direction≥Heat shrinkage ratio (%) at 120° C. in the width direction×0.3+7.0.

4. The biaxially oriented polypropylene film according to claim 1, wherein the biaxially oriented polypropylene film has a refractive index Ny in the width direction of 1.5250 or higher and ΔNy of 0.0240 or higher.

5. The biaxially oriented polypropylene film according to claim 1, wherein the biaxially oriented polypropylene film has a haze of 5.0% or lower.

6. The biaxially oriented polypropylene film according to claim 1, wherein a polypropylene resin constituting the biaxially oriented polypropylene film has a mesopentad fraction of 97.0% or higher.

7. The biaxially oriented polypropylene film according to claim 1, wherein a polypropylene resin constituting the biaxially oriented polypropylene film has a crystallization temperature of 105° C. or higher and a melting point of 160° C. or higher.

8. The biaxially oriented polypropylene film according to claim 1, wherein a polypropylene resin constituting the biaxially oriented polypropylene film has a melt flow rate of 4.0 g/10 min or higher.

9. The biaxially oriented polypropylene film according to claim 1, wherein an amount of a component having a molecular weight of 100,000 or less in a polypropylene resin constituting the biaxially oriented polypropylene film is 35% by mass or more.

10. The biaxially oriented polypropylene film according to claim 2, further satisfying the following (6) and (7):
   (6) a heat shrinkage ratio at 120° C. in a longitudinal direction is 2.0% or lower, and a heat shrinkage ratio at 120° C. in the width direction is 10.0% or lower;
   (7) the heat shrinkage ratio (%) at 120° C. in the width direction and a tensile elastic modulus (GPa) at 23° C. in the width direction satisfy the following formula:
   Tensile elastic modulus (GPa) at 23° C. in the width direction≥Heat shrinkage ratio (%) at 120° C. in the width direction×0.3+7.0.

11. The biaxially oriented polypropylene film according to claim 10, wherein the biaxially oriented polypropylene film has a refractive index Ny in the width direction of 1.5250 or higher and ΔNy of 0.0240 or higher.

12. The biaxially oriented polypropylene film according to claim 11, wherein the biaxially oriented polypropylene film has a haze of 5.0% or lower.

13. The biaxially oriented polypropylene film according to claim 12, wherein a polypropylene resin constituting the biaxially oriented polypropylene film has a mesopentad fraction of 97.0% or higher.

14. The biaxially oriented polypropylene film according to claim 13, wherein a polypropylene resin constituting the biaxially oriented polypropylene film has a crystallization temperature of 105° C. or higher and a melting point of 160° C. or higher.

15. The biaxially oriented polypropylene film according to claim 14, wherein a polypropylene resin constituting the biaxially oriented polypropylene film has a melt flow rate of 4.0 g/10 min or higher.

16. The biaxially oriented polypropylene film according to claim 15, wherein an amount of a component having a molecular weight of 100,000 or less in a polypropylene resin constituting the biaxially oriented polypropylene film is 35% by mass or more.

* * * * *